United States Patent
Ren et al.

(10) Patent No.: US 12,333,627 B2
(45) Date of Patent: Jun. 17, 2025

(54) ARTIFICIAL INTELLIGENCE-BASED IMAGE GENERATION METHOD, DEVICE AND APPARATUS, AND STORAGE MEDIUM

(71) Applicant: Tencent Technology (Shenzhen) Company Limited, Shenzhen (CN)

(72) Inventors: Xiaohang Ren, Shenzhen (CN); Yang Ding, Shenzhen (CN); Xiao Zhou, Shenzhen (CN); Youcheng Ben, Shenzhen (CN); Yuxuan Yan, Shenzhen (CN); Pei Cheng, Shenzhen (CN); Gang Yu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 582 days.

(21) Appl. No.: 17/718,164

(22) Filed: Apr. 11, 2022

(65) Prior Publication Data
US 2022/0237829 A1 Jul. 28, 2022

Related U.S. Application Data

(63) Continuation of application No. PCT/CN2021/091825, filed on May 6, 2021.

(30) Foreign Application Priority Data

May 28, 2020 (CN) .......................... 202010467388.1

(51) Int. Cl.
*G06T 11/00* (2006.01)
*G06T 7/73* (2017.01)
*G06V 10/40* (2022.01)

(52) U.S. Cl.
CPC ................ *G06T 11/00* (2013.01); *G06T 7/73* (2017.01); *G06V 10/40* (2022.01);
(Continued)

(58) Field of Classification Search
None
See application file for complete search history.

(56) References Cited

U.S. PATENT DOCUMENTS

| 10,135,835 B1 | 11/2018 | Kandel et al. |
| 10,250,395 B1 | 4/2019 | Borne-Pons et al. |
| (Continued) | | |

FOREIGN PATENT DOCUMENTS

| CN | 102137111 A | 7/2011 |
| CN | 105488665 A | 4/2016 |
| (Continued) | | |

OTHER PUBLICATIONS

Tencent Technology, WO, PCT/CN2021/091825, Aug. 5, 2021, 6 pgs.
(Continued)

*Primary Examiner* — Andrew H Lam
(74) *Attorney, Agent, or Firm* — Morgan, Lewis & Bockius LLP

(57) ABSTRACT

An embodiment of this application discloses an artificial intelligence-based image generation method performed by a computer device. The method includes: acquiring a source image including a target object whose pose is to be transformed, and a target image including a reference object presenting a target pose; determining a pose transition matrix according to a model pose corresponding to the pose of the target object and a model pose corresponding to the target pose of the reference object; extracting a basic appearance feature of the target object from the source image; processing the basic appearance feature based on the pose transition matrix, to obtain a target appearance feature of the target object in the target pose; and generating a target synthetic image of the target object in the target pose based on the target appearance feature.

20 Claims, 9 Drawing Sheets

(52) U.S. Cl.
CPC .............. *G06T 2207/10016* (2013.01); *G06T 2207/20081* (2013.01); *G06T 2207/20084* (2013.01); *G06T 2207/30196* (2013.01)

(56) References Cited

U.S. PATENT DOCUMENTS

| | | | |
|---|---|---|---|
| 11,024,060 B1* | 6/2021 | Ma | G06V 20/20 |
| 2019/0228556 A1* | 7/2019 | Wang | G06T 17/00 |

FOREIGN PATENT DOCUMENTS

| | | | |
|---|---|---|---|
| CN | 106060036 A | 10/2016 | |
| CN | 106484511 A | 3/2017 | |
| CN | 107465693 A | 12/2017 | |
| CN | 108564119 A | 9/2018 | |
| CN | 110930578 A | 3/2020 | |
| CN | 111027438 A | 4/2020 | |
| CN | 111047548 A | 4/2020 | |
| CN | 111626218 A | 9/2020 | |

OTHER PUBLICATIONS

Tencent Technology, IPRP, PCT/CN2021/091825, Nov. 17, 2022, 7 pgs.
Tencent Technology, Indian Office Action, IN Patent Application No. 202247037535, Feb. 2, 2023, 7 pgs.
Tencent Technology, ISR, PCT/CN2021/091825, Aug. 5, 2021, 2 pgs.

* cited by examiner

ARTIFICIAL INTELLIGENCE-BASED IMAGE GENERATION METHOD, DEVICE AND APPARATUS, AND STORAGE MEDIUM

CROSS-REFERENCE TO RELATED APPLICATIONS

This application is a continuation application of PCT Patent Application No. PCT/CN2021/091825, entitled "IMAGE GENERATION METHOD AND APPARATUS BASED ON ARTIFICIAL INTELLIGENCE, AND DEVICE AND STORAGE MEDIUM" filed on May 6, 2021, which claims priority to Chinese Patent Application No. 202010467388.1, filed with the State Intellectual Property Office of the People's Republic of China on May 28, 2020, and entitled "ARTIFICIAL INTELLIGENCE-BASED IMAGE GENERATION METHOD, DEVICE AND APPARATUS, AND STORAGE MEDIUM", all of which are incorporated herein by reference in their entirety.

FIELD OF THE TECHNOLOGY

This application relates to the technical field of artificial intelligence, and particularly to an image generation technology.

BACKGROUND OF THE DISCLOSURE

In the field of computer vision technologies, the image generation technology has always received great attention. Human pose transfer, as a hot research topic in the image generation technology in recent years, also attracts the attention of more and more researchers. Human pose transfer is to transfer a person in a source image to a human pose in a target image, so that the person in the source image presents the human pose in the target image. In practical applications, human pose transfer has been widely used in many scenarios. For example, a person in a source image can be transferred to a set of preset actions to generate a video of the person in the source image performing this set of actions.

In the related art, human pose transfer is currently mainly realized by using a pre-trained network model to transfer the person in the source image to the human pose in the target image, based on the source image, a pose heatmap of the person in the source image and a pose heatmap of the person in a target image.

However, the pose heatmap is often difficult to accurately characterize the human pose. The pose transfer based on the pose heatmap of the person in the source image and the pose heatmap of the person in the target image tends to cause the human pose of the person after transfer to be greatly different from the human pose of the person in the target image, so the finally generated image is difficult to achieve the expected effect.

SUMMARY

An embodiment of this application provides an artificial intelligence-based image generation method, device, and apparatus, and a storage medium, which can effectively improve the performance of human pose transfer, so that a human pose after transfer is more consistent with a human pose in a target image.

In view of this, a first aspect of this application provides an artificial intelligence-based image generation method.

The method is performed by an apparatus having an image processing ability (e.g., a computer device), and the method includes:

acquiring a source image and a target image, the source image including a target object whose pose is to be transformed, and the target image including a reference object presenting a target pose;

determining a pose transition matrix according to a model pose corresponding to the pose of the target object and a model pose corresponding to the target pose of the reference object;

extracting, as a basic appearance feature, an appearance feature of the target object from the source image;

processing the basic appearance feature based on the pose transition matrix, to obtain a target appearance feature of the target object in the target pose; and generating a target synthetic image of the target object in the target pose based on the target appearance feature.

A second aspect of this application provides an artificial intelligence-based image generation apparatus. The apparatus includes a processor and a storage, the storage being configured to store a computer program; and the processor being configured to implement, according to the computer program, the steps of the artificial intelligence-based image generation method according to the first aspect.

A third aspect of this application provides a non-transitory computer-readable storage medium, the computer-readable storage medium being configured to store a computer program, and the computer program being configured to implement the steps of the artificial intelligence-based image generation method according to the first aspect.

As can be seen from the foregoing technical solutions, the embodiments of this application have the following advantages:

Embodiments of this application provide an artificial intelligence-based image generation method. Unexpectedly, in the method, a model pose of a person in an image is used to characterize a human pose, and a pose transition matrix needed during human pose transfer is determined according to a model pose corresponding to a target object in a source image and a model pose corresponding to a reference object in a target image; then an appearance feature of the target object is extracted from the source image; next, the appearance feature of the target object is rearranged by using the pose transition matrix to obtain a target appearance feature; and finally, a target synthetic image is generated based on the target appearance feature. Compared with the solution of human pose transfer based on a pose heatmap, in the method provided in the embodiments of this application, human pose transfer is performed based on a model pose of a person. Compared with the pose heatmap, the model pose can more accurately characterize the human pose. Therefore, by using the method provided in the embodiments of this application, the transformation of human pose can be better realized, ensuring that the transformed human pose has a higher degree of matching with the target pose presented by the reference object in the target image, and ensuring that the finally generated target synthetic image has a better effect.

DESCRIPTION OF EMBODIMENTS

Figure 1:
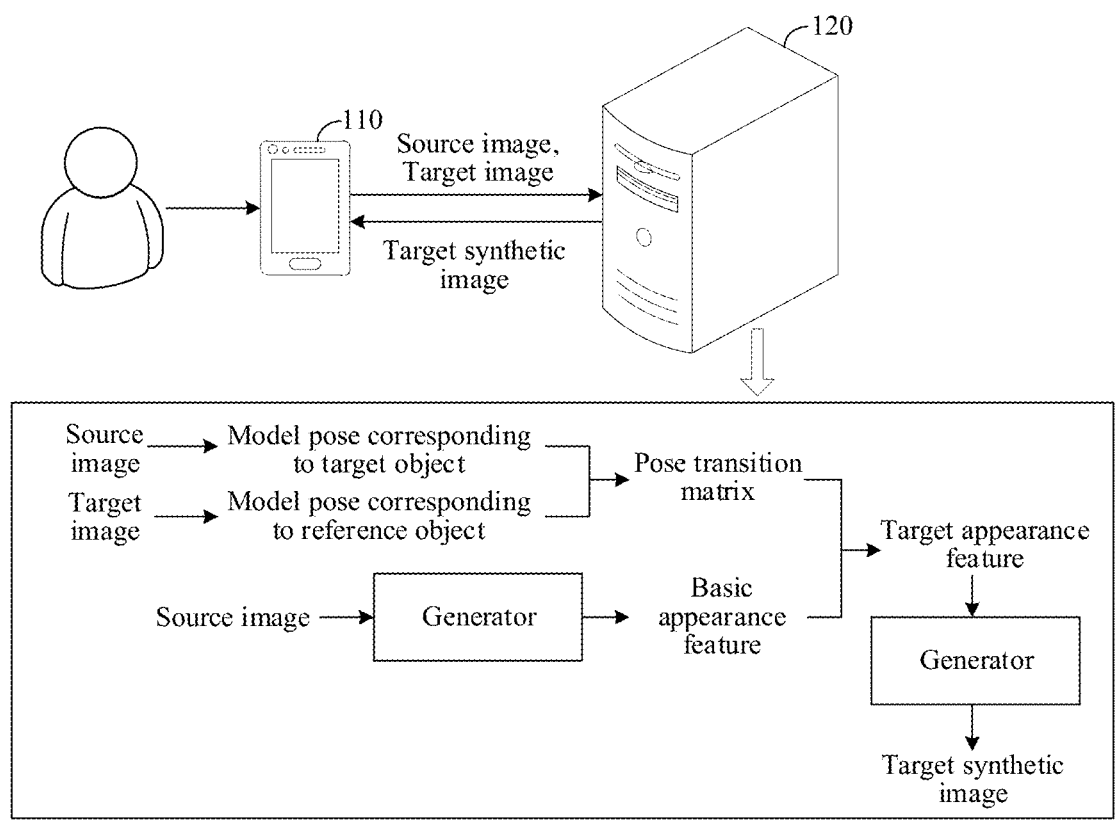
FIG. 1 schematically shows an application scenario of an image generation method provided in an embodiment of this application.

To make a person skilled in the art understand solutions of this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

In the specification, claims, and accompanying drawings of this application, the terms "first", "second", "third", "fourth", and so on (if existing) are intended to distinguish between similar objects rather than describe a specific order or sequence. It is to be understood that the data termed in such a way are interchangeable in proper circumstances, so that the embodiments of this application described herein can be implemented in other orders than the order illustrated or described herein. Moreover, the terms "include" and "contain" and any other variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

AI involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning (ML)/deep learning.

The CV technology is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific subject, CV studies related theories and technologies attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solutions provided in the embodiments of this application relate to technologies such as CV of AI, and are specifically described by using the following embodiments:

In related technologies, human pose transfer is currently mainly realized based on a pose heatmap, and the pose heatmap often has difficulty in accurately characterizing the human pose. Human pose transfer based on the pose heatmap tends to cause a large difference between the human pose after transfer and the expected human pose, so the effect of the image generated after pose transfer is often undesirable.

In view of the technical problems existing in the related art, an embodiment of this application provides an artificial intelligence-based image generation method. In the method, a model pose of a person in an image is used to characterize a human pose, and a pose transition matrix needed during pose transfer is determined according to a model pose in a source image and a model pose in a target image, thus improving the performance of human pose transfer and ensuring that the human pose after transfer can achieve the expected effect.

In the image generation method provided in an embodiment of this application, a source image and a target image are obtained first, where the source image includes a target object whose pose is to be transformed, and the target image includes a reference object presenting a target pose. Then, a model pose corresponding to the target object in the source image and a model pose corresponding to the reference object in the target image are determined, and a pose transition matrix is determined according to the model pose corresponding to the target object and the model pose corresponding to the reference object. At the same time, an appearance feature of the target object is extracted from the source image and used as a basic appearance feature. Further, the basic appearance feature is rearranged by using the pose transition matrix to obtain a target appearance feature. Finally, a target synthetic image is generated based on the target appearance feature.

Compared with the solution of human pose transfer based on a pose heatmap in the related art, unexpectedly, in the image generation method provided in the embodiments of this application, human pose transfer is performed based on a model pose of a person. Compared with the pose heatmap, the model pose can more accurately characterize the human pose. Therefore, by using the method provided in the embodiments of this application, the human pose can be more accurately transformed, ensuring that the transformed human pose is more consistent with the target pose presented by the reference object in the target image, and ensuring that the finally generated target synthetic image has a better effect after human pose transfer.

It is to be understood that an implementation subject of the image generation method provided in the embodiments of this application may be an apparatus having an image processing ability, such as a terminal apparatus or a server. The terminal apparatus may specifically be a smart phone, a computer, a smart TV, a tablet computer, a personal digital assistant (PDA), and the like. The server can be an application server or a web server. In practical deployment, the server can be an independent server, a cluster server or a cloud server.

To facilitate the understanding of the artificial intelligence-based image generation method provided in the embodiments of this application, the application scenario of the image generation method is described below by way of examples where the implementation subject of the image generation method is a server.

FIG. 1 schematically shows an application scenario of an image generation method provided in an embodiment of this application. As shown in FIG. 1, the application scenario includes a terminal apparatus 110 and a server 120. The terminal apparatus 110 is configured to transmit a source image and a target image to the server 120 in response to a user operation. For example, a pre-trained generative adversarial network (GAN) model runs in the server 120, where the GAN model includes a generator. After receiving the source image and the target image transmitted from the terminal apparatus 110, the server 120 implements human pose transfer by using the image generation method provided in the embodiments of this application based on the source image and the target image, to generate a target synthetic image.

The terminal apparatus 110 can be controlled by a user to select the source image and the target image from images locally stored in the terminal apparatus 110, where the source image includes a target object whose pose is to be transformed, and the target image includes a reference object presenting a target pose. After the selection of the source image and the target image, the terminal apparatus 110 can be controlled by the user to transmit the source image and the target image to the server 120 over the network.

It is to be understood that in practical applications, the terminal apparatus 110 may only provide the source image to the server 120, and the server 120 provides a pre-stored image as the target image.

After receiving the source image and the target image transmitted from the terminal apparatus 110, the server 120 determines a model pose corresponding to the target object in the source image and a model pose corresponding to the reference object in the target image respectively, and determines a pose transition matrix needed during pose transfer based on the model pose corresponding to the target object and the model pose corresponding to the reference object. The model poses corresponding to the target object and the reference object may be a 3D model in practical applications. Meanwhile, the server 120 calls the pre-trained GAN model, inputs the received source image into the generator in the GAN model, and extracts, as a basic appearance feature, an appearance feature of the target object from the source image by using the generator. Further, the server 120 rearranges the basic appearance feature by using the pose transition matrix, so that each site on the target object in the source image is transferred to a corresponding site on the reference object in the target image, to obtain a target appearance feature. Finally, the server 120 generates a target synthetic image by using the generator in the GAN model based on the target appearance feature, where the target synthetic image includes the target object presenting the target pose.

After generating the target synthetic image, the server 120 feeds the target synthetic image back to the terminal apparatus 110 over the network, so that the user can view the target synthetic image generated after human pose transfer on the terminal apparatus 110.

The application scenario shown in FIG. 1 is merely an example, and does not constitute a limitation to this solution. In practical applications, in addition to the scenario where the server independently implements the image generation method provided in the embodiments of this application, the image generation method provided in the embodiments of this application may also be independently implemented by the terminal apparatus, or the image generation method provided in the embodiments of this application is implemented by the server and the terminal apparatus that cooperate with each other. Herein, the application scenario of the image generation method provided in the embodiments of this application is not particularly limited.

Embodiments of the artificial intelligence-based image generation method provided in this application will be described in detail below.

Figure 2:
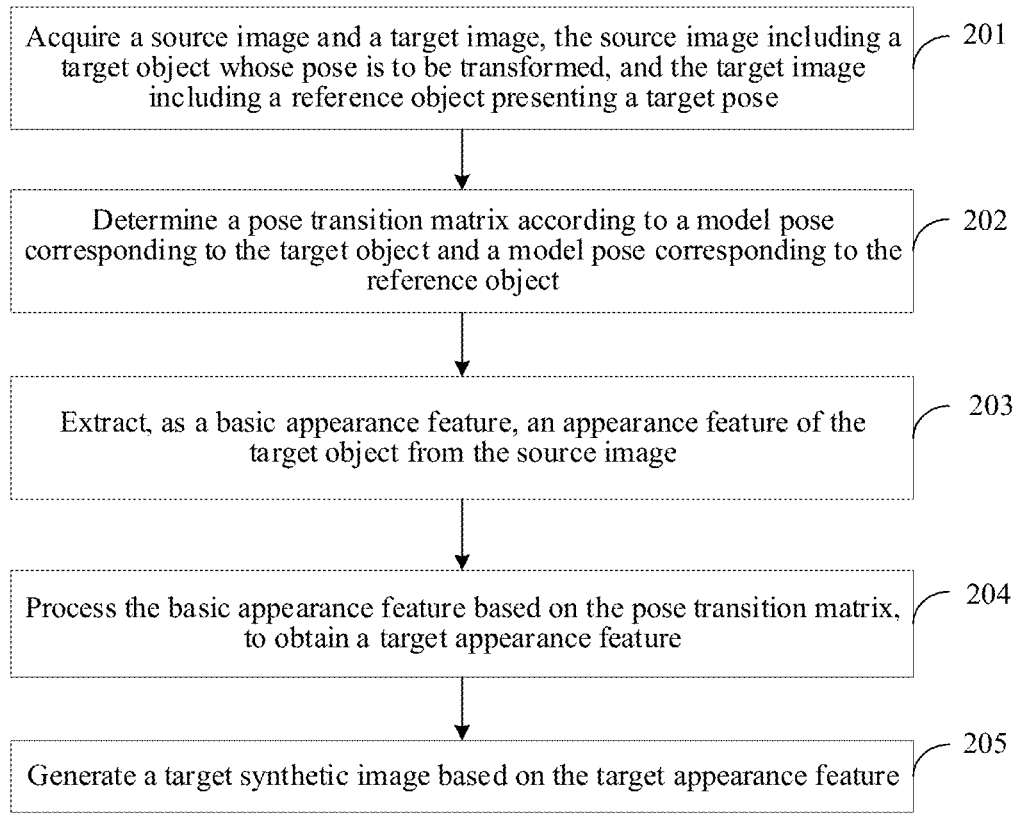
FIG. 2 schematically shows a flow chart of an image generation method provided in an embodiment of this application.

FIG. 2 schematically shows a flow chart of an image generation method provided in an embodiment of this application. For convenience of description, the following embodiments are described by way of examples where a server is used as an implementation subject. As shown in FIG. 2, the image generation method includes the following steps:

Step 201: Acquire a source image and a target image, where the source image includes a target object whose pose is to be transformed, and the target image includes a reference object presenting a target pose.

In practical applications, when a user needs to perform human pose transfer based on a source image and a target image so that a target object in the source image presents a target pose in the target image, the user can select the source image and the target image accordingly, and provide the selected source image and target image to a server.

In an exemplary implementation, the user may correspondingly select the source image and the target image from images stored locally in a terminal apparatus, and control the terminal apparatus to transmit the selected source image and target image to the server. For example, the terminal apparatus may provide a source image selection interface and a target image selection interface to the user. The user selects the source image from the images stored locally in the terminal apparatus via the source image selection interface, and select the target image from the images locally stored in the terminal apparatus via the target image selection interface. After detecting that the user has completed the selection of the source image and the target image, the terminal apparatus provides a source image tag to the image selected via the source image selection interface and a target image tag to the image selected via the target image selection interface, and then transmits the image provided with the source image tag and the image provided with the target image tag to the server, such that the server can obtain the source image and target image.

In another exemplary implementation, the user may select the source image from images stored locally in the terminal apparatus and transmit the selected source image to the server; and select the target image from images pre-stored in the server. For example, the terminal apparatus may provide a source image selection interface to the user. The user can select the source image from the images stored locally in the terminal apparatus via the source image selection interface; and the terminal apparatus transmits the source image to the server after detecting that the user has completed the selection of the source image. The terminal apparatus may also provide a target image selection interface to the user. The user can select the target image from the images pre-stored in the server via the target image selection interface. The terminal apparatus transmits an image identifier selected by the user to the server after detecting that the user has completed the selection of the target image, to notify the server to acquire, as the target image, the image corresponding to the image identifier.

It is to be understood that the above implementations are merely exemplary. In practical applications, the server may also acquire the source image and the target image in other ways, and no particular limitations are imposed on the ways of acquiring the source image and the target image by the server in this application.

In some application scenarios, the user may be intended to transfer a target object in a source image to a set of target actions to obtain a video of the target object performing this set of target actions. In this case, the server needs to acquire the source image and a target action video, take each target video frame in the target action video as a target image, generate a corresponding target synthetic image for each target video frame, and finally arrange the target synthetic image respectively corresponding to each target video frame according to a sequence of timing of each target video frame in the target action video, to obtain a target synthetic video that is the video of the target object performing the actions in the target action video.

For example, the user selects the source image and the target action video and provides them to the server. After acquiring the target action video, the server extracts, as target images, target video frames one by one therefrom according to a sequence of timing; and then implements the image generation method provided in this application based on the source image and the currently processed target video frames, to obtain target synthetic images corresponding to the target video frames, where the target object in the target synthetic images presents target poses of a reference object in the target video frames. After the target synthetic image respectively corresponding to each target video frame in the target action video is generated by the above method, the target synthetic image respectively corresponding to each target video frame is arranged according to the sequence of timing of each target video frame in the target action video, so as to obtain a target synthetic video.

The target video frame may be each video frame in the target action video, or a representative video frame selected from the target action video. For example, video frames with a difference greater than a preset threshold from one another are selected from the target action video and used as the target video frames. The target video frame is not particularly limited in this application.

It is to be understood that in practical applications, the user can correspondingly select the source image and the target action video from images locally stored in the terminal apparatus and provides them to the server, or select the source image from the images locally stored in the terminal apparatus, and select the target action video from action videos pre-stored in the server. The specific implementation of selecting the source image and the target action video is similar to the specific implementation of selecting the source image and the target image above, and will not be repeated here.

Step 202: Determine a pose transition matrix according to a model pose corresponding to the pose of the target object and a model pose corresponding to the target pose of the reference object.

After the server acquires the source image and the target image, the server can respectively determine the model pose corresponding to the target object in the source image and the model pose corresponding to the reference object in the target image. Exemplarily, the server may determine, as the model pose corresponding to the target object, a 3D model corresponding to the target object in the source image, and determine, as the model pose corresponding to the reference object, a 3D model corresponding to the reference object in the target image. Generally, a 3D model of a person includes plural triangular surfaces, e.g., 6840 triangular surfaces, and the 3D model of a person essentially includes the representations of spatial positions of three vertices of each triangle therein. Experimental studies show that the 3D model can more accurately characterize a human pose than a pose heatmap.

It is to be understood that in practical applications, the server can analyze and process the source image and the target image by using any 3D human model algorithm, to obtain the 3D model corresponding to the target object in the source image and the 3D model corresponding to the reference object in the target image. No restrictions are imposed on the implementation of determining the 3D model corresponding to the target object and the 3D model corresponding to the reference object in this application.

It is to be understood that in practical applications, in addition to determining, as the model poses respectively corresponding to the target object and the reference object, the 3D models respectively corresponding to the target object and the reference object, the server may also determine, as the model poses respectively corresponding to the target object and the reference object, a 2D model, a 4D model, or others, respectively corresponding to the target object and the reference object according to actual needs.

The model poses respectively corresponding to the target object and the reference object are not particularly limited in this application.

To shorten the time required to generate the target synthetic image and speed up the generation efficiency of the target synthetic image, the server can pre-determine a model pose corresponding to a reference object in each image stored therein. Correspondingly, after the server detects that the user has selected a target image from images stored therein, it can directly obtain the model pose corresponding to the reference object in the target image, without having to consume time and processing resources to determine the model pose corresponding to the reference object in the target image during the process of generating the target synthetic image.

Similarly, in a scenario where the server provides a target action video to the user, the server can pre-determine a model pose of a reference object in each target video frame in each action video stored in the server. Correspondingly, after the server detects that the user has selected a target action video from action videos stored therein, it can directly obtain the model pose corresponding to the reference object in each target video frame in the target action video.

After the server determines the model pose corresponding to the target object in the source image and the model pose corresponding to the reference object in the target image, it can determine the pose transition matrix required for human pose transfer according to the model pose corresponding to the target object and the model pose corresponding to the reference object. The pose transition matrix characterizes the transfer relationship between corresponding positions on the target object and the reference object.

Exemplarily, the pose transition matrix may be a 3D matrix of h×w×2, where h represents the height of the source image, w represents the width of the source image, and both h and w are in pixels; and 2 represents the dimension of the transfer coordinates in the pose transition matrix. Each point in the matrix represents a position of a point on the target object in the source image on the target pose in the target image. For example, assuming that the coordinates of the fingertip of the left index finger of the target object in the source image are (i, j) and the coordinates of the fingertip of the left index finger of the reference object in the target image are (k, l), then then the point with coordinates (i, j) in the pose transition matrix stores (k, l).

It is to be understood that the above-mentioned pose transition matrix is merely exemplary. In practical applications, the pose transition matrix in the embodiments of this application may also be embodied in other forms, and no limitations are imposed on the form of the pose transition matrix in this application.

Step 203: Extract, as a basic appearance feature, an appearance feature of the target object from the source image.

In an exemplary implementation, the server can extract, as a basic appearance feature, an appearance feature of the target object from the source image. The generator may be one in a GAN model, or in other generative models. If the generator is one in a GAN model, after the server obtains the source image, it can input the source image into the generator in a pre-trained GAN model, and a feature extracting module in the generator extracts a global feature of the source image and then further extracts, as a basic appearance feature, an appearance feature of the target object from the global feature of the source image.

For example, the feature extracting module in the generator can analyze and process the source image to obtain a global feature map corresponding to the source image. The global feature map may be a 3D matrix of h×w×m, where h and w represent the height and width of the source image after proportional scaling, respectively, and m indicates that the global feature map includes m different features (where m may be equal to 256), in which n out of the m features correspond to human appearance features in the source image (where n may be equal to 128), and the rest m−n features correspond to human pose features in the source image. The feature extracting module can extract, as a basic appearance feature, n features corresponding to human appearance from the m features in the global feature map.

In an exemplary implementation, considering that the source image usually contains lots of interference information, such as background information, to reduce the influence of the interference information, it is ensured that the appearance feature of the target object can be accurately extracted from the global feature of the source image, to improve the visual effect of a person in the finally generated target synthetic image. In the method provided in an embodiment of this application, the server determines the locations of appearance feature distribution areas respectively corresponding to N (where N is an integer greater than 1) target appearance feature sites in the source image; and then the server extracts, according to the locations of appearance feature distribution areas respectively corresponding to the N target appearance feature sites, local features respectively corresponding to the N target appearance feature sites from the global feature of the source image to form the basic appearance feature, when extracting the basic appearance feature from the global feature of the source image.

For example, the server can process the source image by a human parsing algorithm to determine the locations of appearance feature distribution areas respectively corresponding to the N target appearance feature sites on the target object in the source image, for example, the locations of appearance feature distribution areas of the face, hair, clothes, pants, hands, shoes and other sites. The result obtained by processing the source image by the human parsing algorithm is usually a 2D matrix of h×w, where h and w represent the height and width of the source image respectively, and each point in the 2D matrix correspondingly carries a number corresponding to the target site to which the position of the point belongs. For example, 0 represents the background, 1 represents the face, 2 represents the hair, and so on.

After the server determines the locations of appearance feature distribution areas respectively corresponding to the N target appearance feature sites on the target object in the source image and obtains the global feature map of the source image, the server can correspondingly extract the local features respectively corresponding to the N target appearance feature sites from the global feature map with reference to the locations of appearance feature distribution areas respectively corresponding to the N target appearance feature sites on the target object. The local features respectively corresponding to the N target appearance feature sites form the appearance feature, that is, the basic appearance feature of the target object.

In practical applications, the server may perform step 202 and step 203 simultaneously, perform step 202 and then step 203, or perform step 203 and then step 202. No restrictions are imposed on the order of performing step 202 and step 203 in this application.

Step 204: Process the basic appearance feature based on the pose transition matrix, to obtain a target appearance feature of the target object in the target pose.

After the server determines the pose transition matrix and the basic appearance feature, the server performs human pose transfer based on the pose transition matrix and the basic appearance feature. That is, the basic appearance feature is rearranged according to the pose transition matrix, and the appearance feature of the target object in the source image is correspondingly transferred to a corresponding pose position in the target image, thereby obtaining a target appearance feature after transfer.

In some cases, the model poses respectively corresponding to the target object and the reference object may not include edge components such as outer edges of the hair and clothes. Accordingly, the pose transition matrix determined based on the model pose corresponding to the target object and the model pose corresponding to the reference object cannot present the positional transfer relationship between these edge components in the target object and the reference object. These edge components can be transferred along with the adjacent components when the server performs human pose transfer. For example, when the hair of the target object is transferred, it can be transferred together with the face of the target object.

Step 205: Generate a target synthetic image of the target object in the target pose based on the target appearance feature.

Since the target appearance feature can characterize the appearance of the target object after human pose transfer, after obtaining the target appearance feature, the server can generate a target synthetic image based on the target appearance feature, where the target synthetic image includes the target object presenting the target pose.

In an exemplary implementation, the target synthetic image can be generated based on the target appearance feature by the generator mentioned in step 203. If the generator is one in a GAN model, an image generation module of the generator in the GAN model can be used to generate the target synthetic image based on the target appearance feature.

The background of the target synthetic image is set according to actual needs. For example, the background of the source image can be used as the background of the target synthetic image. That is, after the server generates a corresponding appearance representation of the target object based on the target appearance feature, the server can paste the appearance representation of the target object into the background of the source image to obtain the target synthetic image. In another example, any image may also be defined as the background of the target synthetic image. That is, the server can obtain a background image selected by the user or a default background image, and paste a corresponding appearance representation of the target object into the background image after generating the appearance representation of the target object based on the target appearance feature, to obtain the target synthetic image. No restrictions are imposed on the background of the target synthetic image in this specification.

In some embodiments, to further optimize the effect of the finally generated target synthetic image so that the visual effect of the target object is more harmonious and natural, in the method provided in an embodiment of this application, the server may further acquire a pose feature of the reference object in the target image, where the pose feature of the reference object is extracted from a global feature of the target image, and the global feature of the target image is determined by the generator. Then, the target synthetic image is generated by the image generation module in the generator based on the pose feature of the reference object and the target appearance feature.

For example, the server can use the feature extracting module of the generator in a GAN model to extract the global feature of the target image, and then extract the pose feature of the reference object from the global feature of the target image. Similar to the implementation where the server extracts the appearance feature of the target object from the global feature of the source image, the feature extracting module analyzes and processes the target image, to obtain a global feature map corresponding to the target image, that is, a 3D matrix of h×w×m, in which, h and w represent the height and width of the target image after proportional scaling respectively, and m indicates that the global feature map includes m different features (where m may be equal to 256), in which n out of the m features correspond to human appearance features in the target image (where n may be equal to 128), and the rest m−n features correspond to human pose features in the target image. The feature extracting module can extract, as pose features of the reference object, m−n features corresponding to human pose from the m features in the global feature map.

To ensure that the extracted pose features are more accurate, the server can also process the target image by using a human parsing algorithm to determine the locations of appearance feature distribution areas respectively corresponding to N target appearance feature sites on the reference object in the target image, and then extract the appearance features of the reference object from the global feature of the target image with reference to the locations of appearance feature distribution areas respectively corresponding to the N target appearance feature sites, where the rest of the global feature other than the appearance features are used as the pose features of the reference object.

After obtaining the pose features of the target appearance feature and the reference object, the server can splice the target appearance feature with the pose feature of the reference object, and the image generation module in the generator generates the target synthetic image based on the spliced feature. In practical applications, the generator may also perform any one or more processing such as adding, taking the larger value, and taking the average, etc. on the target appearance feature and the pose feature of the reference object. The image generation module in the generator generates the target synthetic image based on the processed feature. The method of correcting the target appearance feature by using the pose feature of the reference object is not limited in this application.

Figure 3:
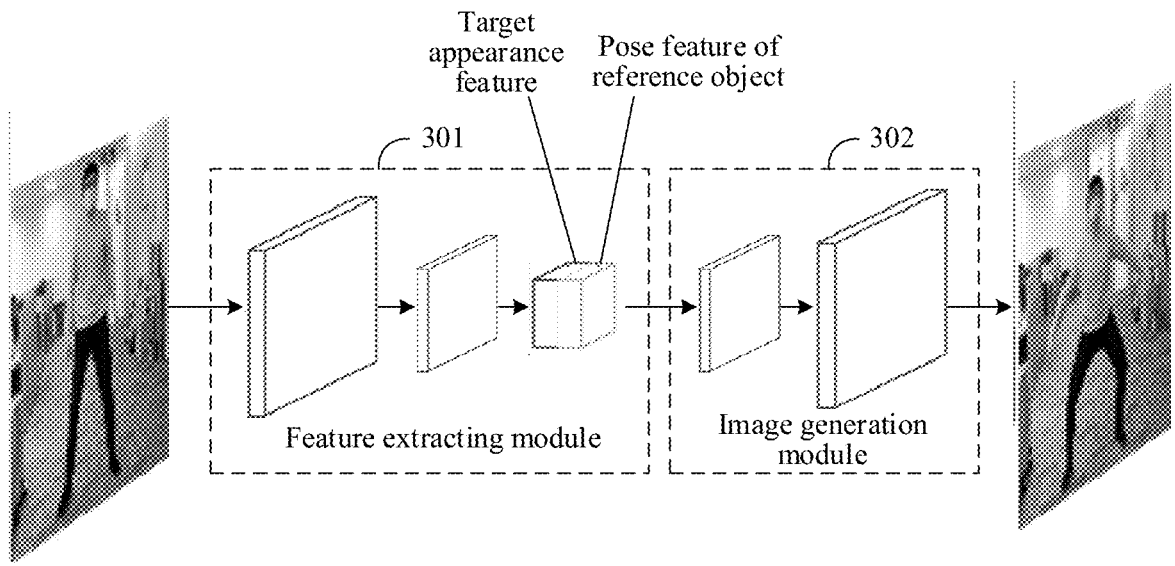
FIG. 3 schematically shows the working principle of a generator in a GAN model provided in an embodiment of this application.

To facilitate the understanding of the above implementations, an implementation process of generating a target synthetic image is exemplarily described with reference to a schematic diagram of the working principle of a generator in a GAN model shown in FIG. 3. As shown in FIG. 3, the generator in a GAN model includes a feature extracting module 301 and an image generation module 302. The feature extraction module 301 is configured to process an inputted source image to obtain a global feature of the source image, and extract an appearance feature, that is, a basic appearance feature of a target object from the global feature of the source image. The basic appearance feature is rearranged by using a pose transition matrix to obtain a target appearance feature, and then the target appearance feature is spliced with a pose feature of a reference object in a target image. Then the spliced feature is inputted into the image generation module 302, and the spliced feature is processed by the image generation module 302, to generate a target synthetic image.

To shorten the time required to generate the target synthetic image and speed up the generation efficiency of the target synthetic image, the server can pre-determine a pose feature of a reference object in each image stored therein. Correspondingly, after the server detects that the user has selected a target image from images stored therein, it can directly obtain the pose feature of the reference object in the target image, and correct the target appearance feature obtained after human pose transfer by using the pose feature, without having to consume time and processing resources to determine the pose feature corresponding to the reference object in the target image during the process of generating the target synthetic image.

Similarly, in a scenario where the server provides a target action video to the user, the server can pre-determine a pose feature of a reference object in each target video frame in each action video stored in the server. Correspondingly, after the server detects that the user has selected a target action video from action videos stored therein, it can directly obtain the pose feature of the reference object in each target video frame in the target action video.

Compared with the solution of human pose transfer based on a pose heatmap in the related art, unexpectedly, in the image generation method provided in the embodiments of this application, human pose transfer is performed based on a model pose of a person. Compared with the pose heatmap, the model pose can more accurately characterize the human pose. Therefore, by using the method provided in the embodiments of this application, the human pose can be more accurately transformed, ensuring that the transformed human pose is more consistent with the target pose presented by the reference object in the target image, and ensuring that the finally generated target synthetic image has a better effect after human pose transfer.

To facilitate the further understanding of the artificial intelligence-based image generation method, the image generation method is wholly exemplarily described by way of example in which a target object in a source image is transferred to a video of a set of target actions pre-stored in the server by using a 3D model as a model pose.

Figure 4:
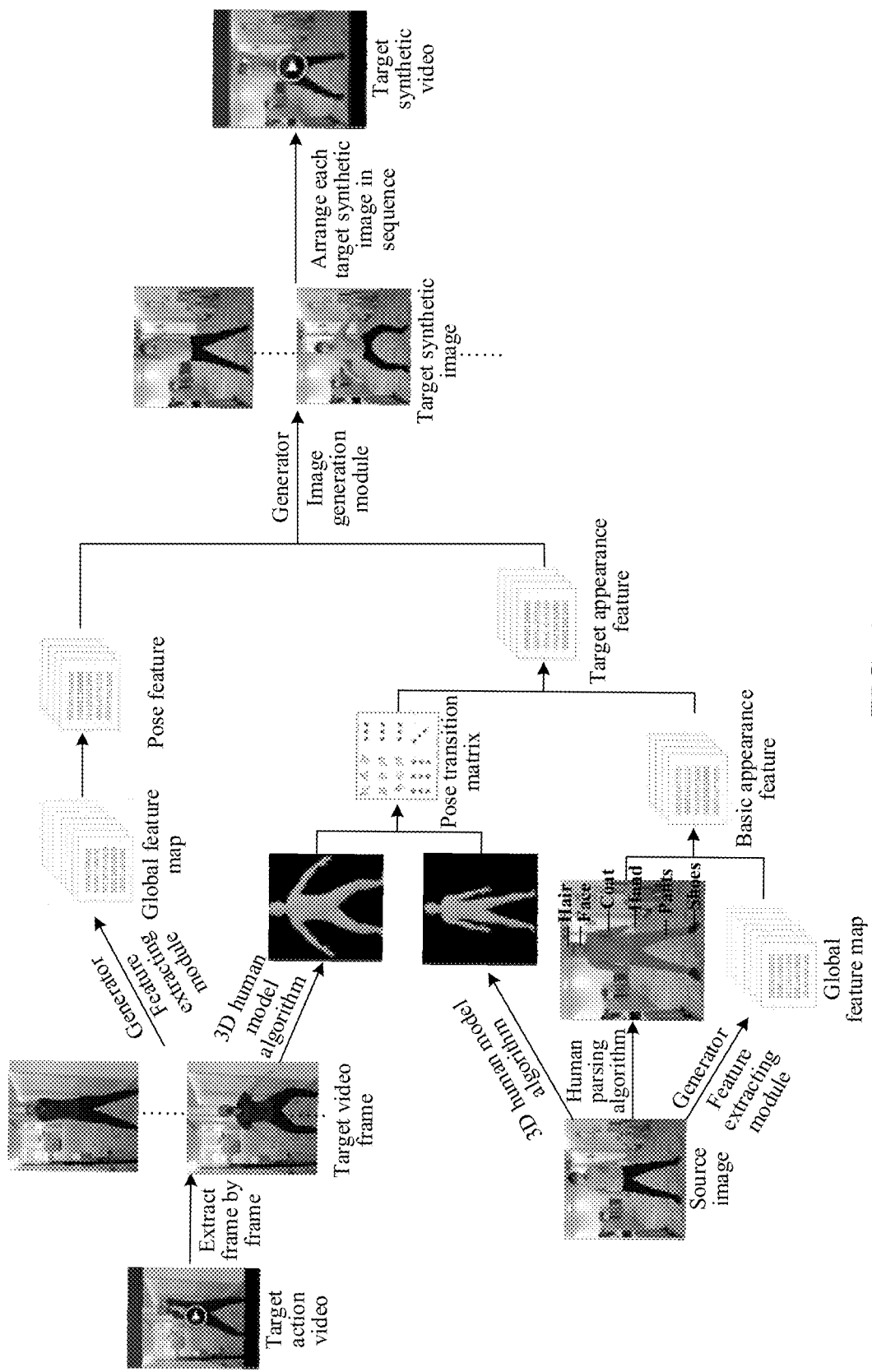
FIG. 4 schematically shows the principle of an image generation method provided in an embodiment of this application.

FIG. 4 schematically shows the principle of an image generation method provided in an embodiment of this application. After acquiring a source image sent by the terminal apparatus, the server can process the source image by using a 3D human model algorithm, to determine a 3D model corresponding to the target object in the source image, and characterize the pose of the target object in the source image with the 3D model. In addition, the server can also process the source image by using a human parsing algorithm to determine locations of appearance feature distribution areas respectively corresponding to N target appearance feature sites (such as face, hair, clothes, pants, hands, and shoes, etc.).

Then, the source image is inputted into a generator in a pre-trained GAN model, a global feature map corresponding to the source image is determined by a feature extracting module in the generator, and an appearance feature of the target object is extracted from the global feature map according to the result of human parsing (that is, the locations of appearance feature distribution areas respectively corresponding to the N target appearance feature sites). Meanwhile, the server acquires a 3D model corresponding to a reference object in a currently processed target video frame in a target action video, where the 3D model corresponding to the reference object in the target video frame is predetermined by the server. The server obtains a pose transition matrix by a matrix operation according to the 3D model corresponding to the target object and the 3D model corresponding to the reference object. Further, the server rearranges the appearance feature of the target object by using the pose transition matrix to obtain a target appearance feature, resulting in that each site on the target object in the source image is transferred to a corresponding site on the reference object in the target image.

A pose feature of the reference object in the currently processed target video frame is obtained, where the pose feature of the reference object in the target video frame is also predetermined by the server. The pose feature of the reference object is spliced with the target appearance feature, and inputted into an image generation module in the generator, to obtain a target synthetic image corresponding to the target video frame.

The above process is performed on each target video frame in the target action video, to obtain a target synthetic image respectively corresponding to each target video frame. Then, the target synthetic image respectively corresponding to each target video frame is correspondingly arranged according to a sequence of timing of each target video frame in the target action video, to generate a target synthetic video where the target object performs the actions in the target action video.

In addition, an embodiment of this application also provides a GAN model training method. To facilitate the understanding of the GAN model training method, the GAN model is briefly described below. The GAN model generally includes a generator and a discriminator. The generator is configured to generate an image according to inputted information, and the discriminator is configured to discriminate the image outputted by the generator from a corresponding authentic image. In the training process, the generator needs to fool the discriminator as much as possible. The generator and the discriminator confront with each other and the parameters are constantly adjusted, to finally achieve a desirable effect that the discriminator cannot determine whether the image outputted by the generator is authentic.

Figure 5:
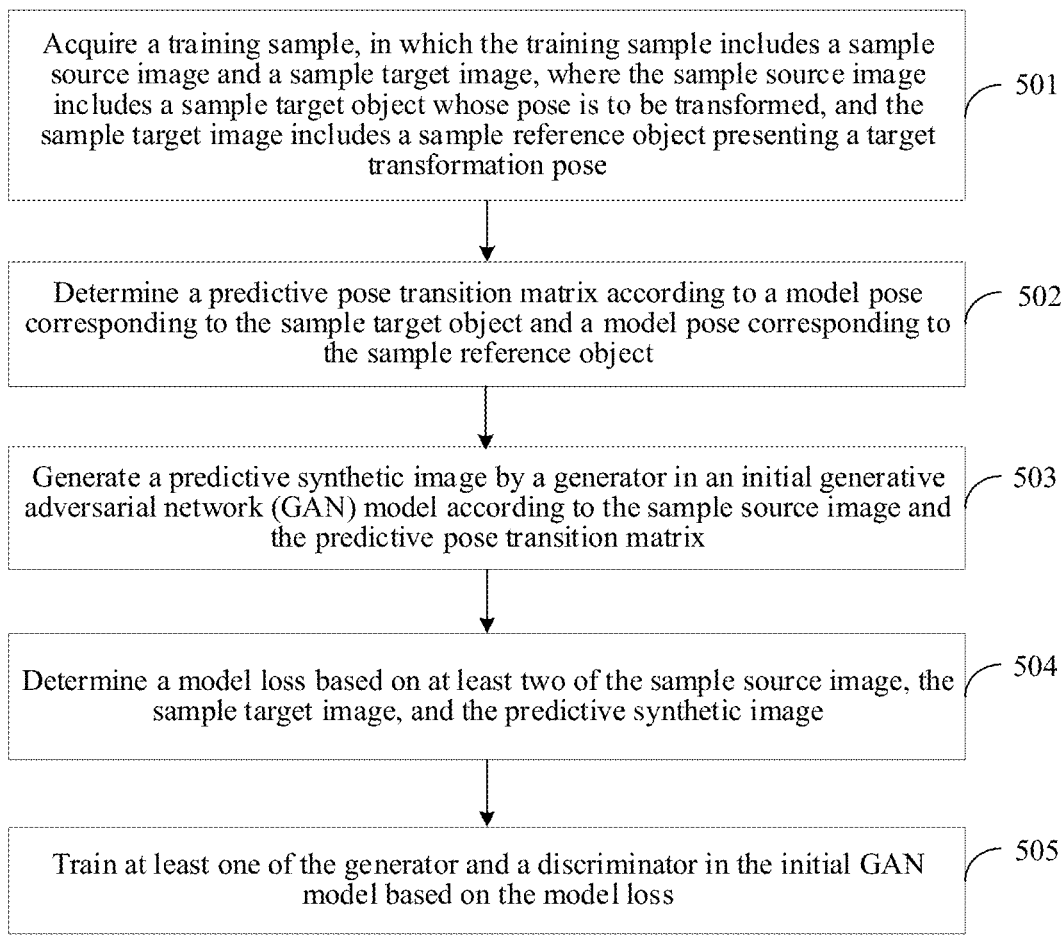
FIG. 5 schematically shows a flow chart of a GAN model training method provided in an embodiment of this application.

FIG. 5 schematically shows a flow chart of a GAN model training method provided in an embodiment of this application. For convenience of description, the following embodiment is described by way of example where a server is used as an implementation subject. As shown in FIG. 5, the GAN training method includes the following steps:

Step 501: Acquire a training sample. The training sample includes a sample source image and a sample target image, where the sample source image includes a sample target object whose pose is to be transformed, and the sample target image includes a sample reference object presenting a target transformation pose.

When the server trains a GAN model, a large number of training samples needs to be acquired. Each training sample includes a sample source image and a sample target image, where the sample source image includes a sample target object whose pose is to be transformed, and the sample target image includes a sample reference object presenting a target transformation pose.

In an exemplary implementation, the server may obtain training samples required for training the GAN model based on an action video. For example, the server can capture, as a sample source image, a video frame from an action video; and capture, as a sample target image, any other video frame from the action video, and pair it with the sample source image to form a training sample. In this way, the server can pair each video frame in the action video to establish a large number of training samples.

It is to be understood that in practical applications, in addition to obtaining the training samples of a GAN model based on an action video, two images including objects presenting specific action poses can also be selected at will from a database storing a large number of images, to form a training sample. No restrictions are imposed on the method of obtaining the training samples of the GAN model in this application.

Step 502: Determine a predictive pose transition matrix according to a model pose corresponding to the sample target object and a model pose corresponding to the sample reference object.

After the server obtains the training sample, the sample source image and the sample target image in the training sample are processed respectively by using a 3D human model algorithm, to obtain a 3D model corresponding to the sample target object in the sample source image, which is used as a model pose corresponding to the sample target object, and obtain a 3D model corresponding to the sample reference object in the sample target image, which is used as a model pose corresponding to the sample reference object. Furthermore, according to the model pose corresponding to the sample target object and the model pose corresponding to the sample reference object, a predictive pose transition matrix is determined. The predictive pose transition matrix characterizes the transfer relationship between corresponding positions on the sample target object and the sample reference object.

The implementation of determining the model poses respectively corresponding to the sample target object and the sample reference object is the same as the implementation of determining the model poses respectively corresponding to the target object and the reference object in the embodiment shown in FIG. 2, and will not be repeated here. The implementation of determining the predictive pose transition matrix is the same as the implementation of determining the pose transition matrix in the embodiment shown in FIG. 2. The details can be made reference to relevant description of step 202 in the embodiment shown in FIG. 2, and will not be repeated here.

It is to be understood that in practical applications, in addition to determining, as the model poses respectively corresponding to the sample target object and the sample reference object, the 3D models respectively corresponding to the sample target object and the sample reference object, the server may also determine, as the model poses respectively corresponding to the sample target object and the sample reference object, a 2D model, a 4D model, or others, respectively corresponding to the sample target object and the sample reference object. The model poses respectively corresponding to the sample target object and the sample reference object are not particularly limited in this application.

Step 503: Generate a predictive synthetic image by a generator in an initial generative adversarial network (GAN) model according to the sample source image and the predictive pose transition matrix.

The server inputs the sample source image in the training sample into a generator in an initial GAN model, and a feature extracting module in the generator extracts a global feature of the sample source image and then further extracts an appearance feature of the sample target object from the global feature. The appearance feature of the sample target object is rearranged by using the predictive pose transition matrix, and the appearance feature of the sample target object in the sample source image is correspondingly transferred to a corresponding pose position in the sample target image, to obtain a predictive target appearance feature after transfer. Then a predictive synthetic image is generated by an image generation module in the generator according to the predictive target appearance feature.

In an exemplary implementation, to ensure that the appearance feature of the sample target object can be accurately extracted from the global feature of the sample source image, the training reliability of the GAN model is improved. After the server obtains the training sample, the server can process the sample source image by using a human parsing algorithm to determine the locations of appearance feature distribution areas respectively corresponding to N target appearance feature sites on the sample target subject; and then the server extracts, according to the locations of appearance feature distribution areas respectively corresponding to the N target appearance feature sites, local features respectively corresponding to the N target appearance feature sites from the global feature of the sample source image to form the appearance features of the sample target subject, when extracting the appearance features of the sample target subject from the global feature of the sample source image.

In an exemplary implementation, after the predictive target appearance feature is obtained by pose transfer on the appearance feature of the sample target object by using the predictive pose transition matrix, the target appearance feature can be further corrected by using a pose feature of the sample reference object in the sample target image. For example, the server can use the feature extracting module of the generator in an initial GAN model to extract the global feature of the sample target image, and then extract the pose feature of the sample reference object from the global feature. Then the predictive synthetic image is generated by the image generation module in the generator according to the predictive target appearance feature and the pose feature of the sample reference object.

Here, the implementation of extracting the appearance feature of the sample target object in the sample source image by the generator in an initial GAN model is the same as the implementation of extracting the appearance feature of the target object in the source image in the embodiment shown in FIG. 2, except that an initial GAN model to be trained is used in this embodiment. The details can be made reference to relevant description of step 203 in the embodiment shown in FIG. 2, and will not be repeated here. The implementation of transforming the appearance feature of the sample target object by using the predictive pose transition matrix is the same as the implementation of transforming the basic appearance feature by using the pose transition matrix in the embodiment shown in FIG. 2. The details can be made reference to relevant description of step 204 in the embodiment shown in FIG. 2, and will not be repeated here. Here, the implementation of generating the predictive synthetic image by the generator in an initial GAN model based on the predictive target appearance feature is the same as the implementation of generating the target synthetic image based on the target appearance feature in the embodiment shown in FIG. 2, except that an initial GAN model to be trained is used in this embodiment. The details can be made reference to relevant description of step 205 in the embodiment shown in FIG. 2, and will not be repeated here.

Step 504: Determine a model loss based on at least two of the sample source image, the sample target image, and the predictive synthetic image.

Step 505: Train at least one of the generator and the discriminator in the initial GAN model based on the model loss.

Since step 504 and step 505 are highly correlated, the specific implementations of step 504 and step 505 will be described together below. After the server generates the predictive synthetic image by the generator in the initial GAN model based on the sample source image and the predictive pose transition matrix, the server can establish a model loss for training the initial GAN model according to at least two of the sample source image, the sample target image, and the predictive synthetic image, and train at least one of the generator and the discriminator in the initial GAN model based on this model loss.

An embodiment of this application exemplarily provides several model losses for training the generator and/or the discriminator. The methods for establishing these model losses and the corresponding training methods are described below.

I. Discriminant loss: The server can determine a first discriminant authenticity by the discriminator in the initial GAN model according to the sample source image and the predictive synthetic image; determine a second discriminant authenticity by the discriminator in the initial GAN model according to the sample source image and the sample target image; and establish, as the model loss, a discriminant loss according to the first discriminant authenticity and the second discriminant authenticity. When the initial GAN model is trained, the generator and the discriminator in the initial GAN model can be trained based on the discriminant loss.

Assuming that the sample source image in the training sample is a, the sample target image is b, and the predictive synthetic image generated by the generator in the initial GAN model is a', the server can assign the sample source image a and the predictive synthetic image a' to group A, and assign the sample source image a and the sample target image b to group B. The sample source image a and the predictive synthetic image a' in group A are inputted into the discriminator in the initial GAN model to obtain a first discriminant authenticity Dr (A) outputted by the discriminator; and the sample source image a and the sample target image b in group B are inputted into the discriminator in the initial GAN model to obtain a second discriminant authenticity Dr (B) outputted by the discriminator. It is to be understood that the first discriminant authenticity Dr (A) can characterize the authenticity of the predictive synthetic image a', and the second discriminant authenticity Dr (B) can characterize the authenticity of the sample target image b. The discriminant authenticity outputted by the discriminator is generally in the range of 0 to 1, and a higher discriminant authenticity indicates a greater possibility that the input image is authentic. Then, the discriminant loss Lr can be calculated by the server according to Formula (1);

$$Lr = Dr(A) - Dr(B) + 1 \qquad (1)$$

After the server obtains the discriminant loss Lr, the server can train the generator and the discriminator in the initial GAN model simultaneously by using the discriminant loss Lr, to adjust the model parameters of the generator and the discriminator in the initial GAN model.

II. Global loss: After the server obtains the predictive synthetic image outputted by the generator in the initial GAN model, the server can establish, as the model loss, a global loss according to the difference between the predictive synthetic image and the sample target image. When the initial GAN model is trained, the generator in the initial GAN can be trained by the server based on the global loss.

Assuming that the sample source image in the training sample is a, the sample target image is b, and the predictive synthetic image generated by the generator in the initial GAN model is a', the server can calculate the global loss La by Formula (2) based on a pixel value of the predictive synthetic image a' and a pixel value of the sample target image b:

$$La = |a' - b|^2 \qquad (2)$$

After the server obtains the global loss La, the server can train the generator in the initial GAN model by using the global loss La, to adjust the model parameter of the generator in the initial GAN model.

III. Local component loss: After the server obtains the predictive synthetic image outputted by the generator in the initial GAN model, the server can determine the positions of appearance feature distribution areas respectively corresponding to N target appearance feature sites on a predictive target object in the predictive synthetic image, and positions of appearance feature distribution areas respectively corresponding to the N target appearance feature sites on the sample reference object in the sample target image. Then, for each of the N target appearance feature sites, the server extracts a local feature of a target site in the predictive synthetic image by a deep convolutional neural network model, according to the position of distribution area of the target site in the predictive synthetic image. The server extracts a local feature of a target site in the sample target image by the deep convolutional neural network model, according to the position of distribution area of the target site in the sample target image. Then, the server determines, as the model loss, a local component loss corresponding to the target site according to the local feature of the target site in the predictive synthetic image and the local feature of the target site in the sample target image. When the initial GAN model is trained, the generator in the initial GAN model can be trained by the server based on the local component loss respectively corresponding to the N target appearance feature sites.

Assuming that the sample source image in the training sample is a, the sample target image is b, and the predictive synthetic image generated by the generator in the initial GAN model is a', the server can parse the predictive synthetic image a' by a human parsing algorithm, then obtain N mask matrices according to the parsing results, and determine, based on the N mask matrices, a position of distribution area corresponding to each target site on the predictive target object in the predictive synthetic image a', which is designated as Sa1'. Following the same method, the sample target image b is processed, to determine a position of distribution area corresponding to each target site on the sample reference object in the sample target image, which is designated as Sb1. The Sa1' corresponding to a certain target site is inputted into a Visual Geometry Group (VGG) network that has completed parameter learning, to obtain a local feature Fv (a1') outputted by the VGG network, and the Sb1 corresponding to the target site is inputted into the VGG network to obtain a local feature Fv (b1) outputted by the VGG network. Then the local component loss Lp1 corresponding to the target site is calculated by Formula (3):

$$Lp1 = |Fv(a1') - Fv(b1)|^2 \qquad (3)$$

After the server obtains the local component loss Lp1 corresponding to each of the N target appearance feature sites through the above method, the generator in the initial GAN model can be trained by using the local component loss Lp1 corresponding to each of the N target appearance feature sites, to adjust the model parameter of the generator in the initial GAN model.

It is to be understood that in practical applications, in addition to the use of a VGG model to extract the local features of each target site, other deep convolutional neural network models can also be used to extract the local features of each target site. The model used for extracting the local features is not particularly limited in this application.

IV. Global component loss After the server obtains the predictive synthetic image outputted by the generator in the initial GAN model, the server can determine the positions of appearance feature distribution areas respectively corresponding to N target appearance feature sites on a predictive target object in the predictive synthetic image, and determine a first global component feature by using a deep convolutional neural network model according to the positions of appearance feature distribution areas respectively corresponding to the N target appearance feature sites on the predictive target object in the predictive synthetic image. The server determines the positions of appearance feature distribution areas respectively corresponding to the N target appearance feature sites on the sample reference object in the sample target image, and determine a second global component feature by using the deep convolutional neural network model according to the positions of appearance feature distribution areas respectively corresponding to the N target appearance feature sites on the sample reference object in the sample target image. Then, the server establishes, as the model loss, a global component loss based on the first global component feature and the second global component feature. When the initial GAN model is trained, the generator in the initial GAN can be trained by the server based on the global component loss.

Assuming that the sample source image in the training sample is a, the sample target image is b, and the predictive synthetic image generated by the generator in the initial GAN model is a', the server can parse the predictive synthetic image a' by a human parsing algorithm, then obtain N mask matrices according to the parsing results, and determine, based on the N mask matrices, a position of distribution area corresponding to N target appearance feature sites as a whole on the predictive target object in the predictive synthetic image a', which is designated as Sa2'. Following the same method, the sample target image b is processed, to determine a position of distribution area corresponding to the N target appearance feature sites on a whole on the sample reference object in the sample target image, which is designated as Sb2. The Sa2' is inputted into a Visual Geometry Group (VGG) network that has completed parameter learning, to obtain a first global component feature Fv (a2') outputted by the VGG network, and the Sb2 is inputted into the VGG network to obtain a second global component feature Fv (b2) outputted by the VGG network. Then the global component loss Lp2 corresponding to the target site is calculated by Formula (4):

$$Lp2 = |Fv(a2') - Fv(b2)|^2 \qquad (4)$$

After the server obtains the global component loss Lp2, the server can train the generator in the initial GAN model by using the global component loss Lp2, to adjust the model parameter of the generator in the initial GAN model.

It is to be understood that in practical applications, in addition to the use of a VGG model to extract the global component features, other deep convolutional neural network models can also be used to extract the global component features. The model used for extracting the global component features is not particularly limited in this application.

V. Facial loss After the server obtains the predictive synthetic image outputted by the generator in the initial GAN model, the server can determine, as a first facial feature, a facial feature of a predictive target object in the predictive synthetic image by using a face recognition network model according to the predictive synthetic image. The server determines, as a second facial feature, a facial feature of the sample target object in the target source image by using the face recognition network model according to the sample source image. Then, the server determines, as the model loss, a facial loss according to the first facial feature and the second facial feature. When the initial GAN model is trained, the generator in the initial GAN can be trained by the server based on the facial loss.

Assuming that the sample source image in the training sample is a, the sample target image is b, and the predictive synthetic image generated by the generator in the initial GAN model is a', the server can input the predictive synthetic image a' into the ArcFace network that has completed parameter learning, to obtain a facial feature Fa (a') of the predictive target object outputted by the ArcFace network, and input the sample source image a into the ArcFace network, to obtain a facial feature Fa (a) of the sample target object outputted by the ArcFace network. Then the facial loss Lf is calculated by Formula (5):

$$Lf = |Fa(a') - Fa(a)|^2 \qquad (5)$$

After the server obtains the facial loss Lf, the server can train the generator in the initial GAN model by using the facial loss Lf, to adjust the model parameter of the generator in the initial GAN model.

It is to be understood that in practical applications, in addition to the use of ArcFace network to extract the facial features of the objects in the images, other face recognition network models can also be used to extract the facial features. The model used for extracting the facial features is not particularly limited in this application.

In practical applications, the server can train the generator and/or the discriminator in the initial GAN model by using at least one of the above five model losses. In addition to the above five model losses, the server can also determine other model losses based on at least two of the predictive target image, the sample source image and the sample target image, and train the generator and/or the discriminator in the initial GAN model by the determined model losses. The model loss used for training the initial GAN model is not limited in this application.

Steps 501 to 505 are repeated with different training samples, to repeatedly and iteratively train the initial GAN model until the initial GAN model meets an end condition of training. As a result, a GAN model that can be put into practical use is obtained. It is to be understood that the end condition of training here means that the accuracy of images generated by the initial GAN model reaches a preset accuracy, or the number of training samples used reaches a preset number. The end condition of training is not particularly limited in this specification.

The model parameters of the initial GAN model can be trained and adjusted by the GAN model training method provided in the embodiments of this application based on various model losses, to ensure that the trained GAN model has better performance and can generate synthetic images having better effect. Training the initial GAN model based on the local component loss and/or the global component loss can effectively enhance the texture detail representation of each site (such as clothes, hands, etc.) in the generated image; and training the initial GAN model based on the facial loss can effectively enhance the sharpness of the face of a person in a generated images, reduce the possible facial deformation during human pose transfer, and enhance the recognizability of the person in the generated image.

To further facilitate the understanding of the GAN model training method, the above-mentioned GAN model training method is generally exemplarily described below.

Figure 6:
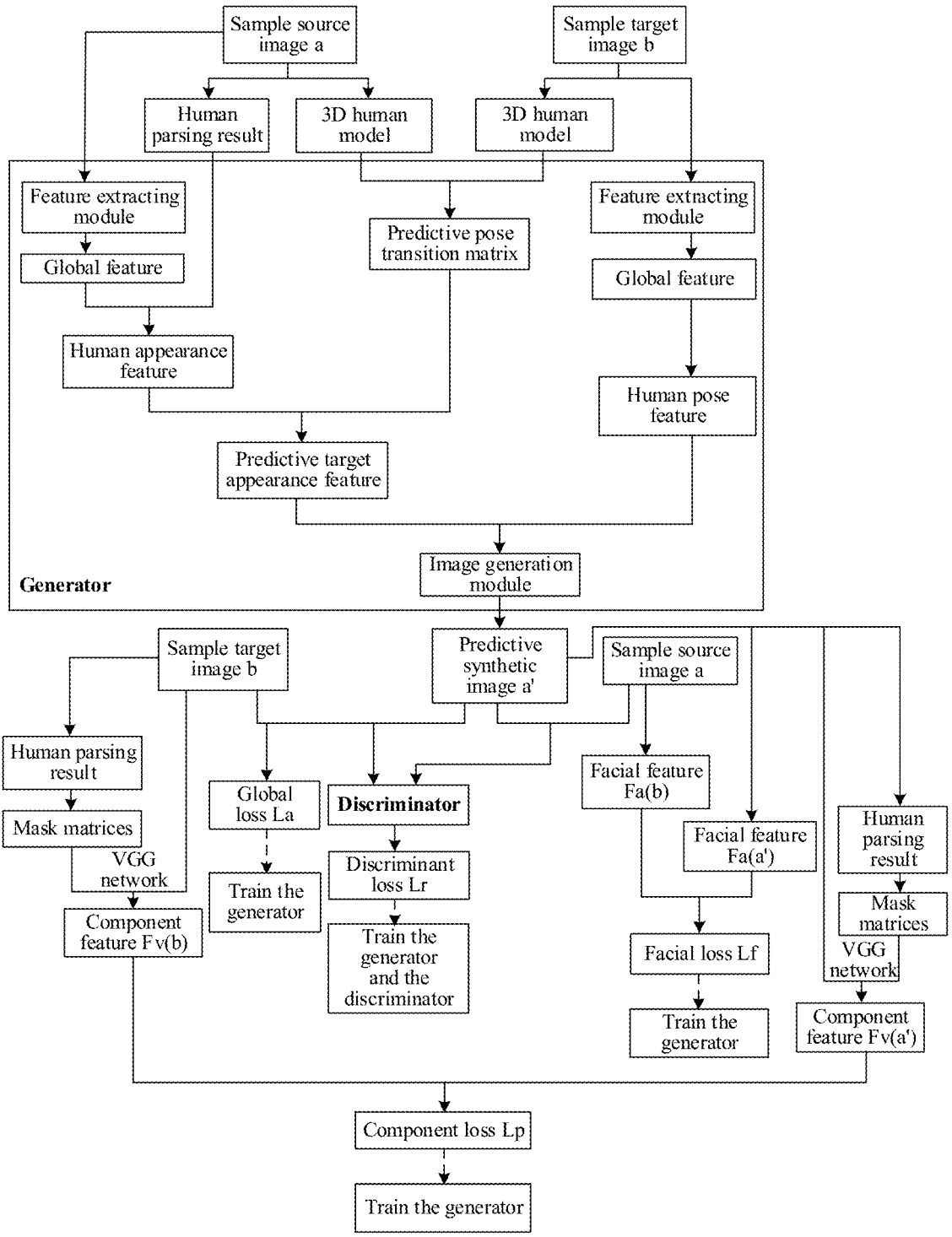
FIG. 6 schematically shows the principle of a GAN model training method provided in an embodiment of this application.

FIG. 6 schematically shows the principle of a GAN model training method provided in an embodiment of this application. As shown in FIG. 6, the GAN training method includes the following steps:

Step 1: The server determines, for each video frame in an action video, a 3D human model corresponding to an object in a video frame by using a 3D human model algorithm, and determines a human parsing result corresponding to the video frame by using a human parsing algorithm, that is, positions of appearance feature distribution areas respectively correspondingly to N target appearance feature sites on the object in the video frame. Each video frame in the action video is formed into a frame pair with another video frame in the action video, and a large number of frame pairs are constructed as training samples of an initial GAN model. Each frame pair includes a sample source image a and a sample target image b.

Step 2: Select a frame pair at will from the constructed frame pairs, input the sample source image a in the frame pair into a generator in the initial GAN model, and extract a global feature image of the sample source image a by a feature extracting module in the generator; and then extract a human appearance feature from the global feature of the sample source image according to the result of human parsing of the sample source image a. Meanwhile, the server can determine a predictive pose transition matrix according to a 3D human model corresponding to an object in the sample source image a and a 3D human model corresponding to an object in the sample target image b in the frame pair. The human appearance feature extracted from the sample source image a is rearranged by using the predictive pose transition matrix, to obtain a predictive target appearance feature.

Step 3: The server inputs the sample target image b in the frame pair into the generator in the initial GAN model, and the feature extracting module in the generator extracts a global feature of the sample target image and then further extracts a human pose feature of the object in the sample target image b from the global feature. Finally, a predictive synthetic image a' is generated by an image generation module in the generator according to the predictive target appearance feature and the human pose feature of the object in the sample target image b.

Step 4: Assign the sample source image a and the predictive synthetic image a' into group A, and assign the sample target image b and the sample source image a into B; input the images in group A into a discriminator in the initial GAN model, to obtain an authenticity Dr(A) outputted by the discriminator; input the images in group B into the discriminator in the initial GAN model, to obtain an authenticity Dr(B) outputted by the discriminator; and then calculate a discriminant loss Lr by Formula: Lr=Dr(A)−Dr(B)+1

Step 5: Based on a pixel value of the predictive synthetic image a' and a pixel value of the sample target image b, determine a global loss La by Formula: $La=|a'-b|^2$ Step 6: Perform human parsing on the predictive synthetic image a' by using the human parsing algorithm, to obtain a result of human parsing, obtain N mask matrices according to the result of human parsing, extract positions of appearance feature distribution areas of N target appearance feature sites in the predictive synthetic image a', which are designated as Sa'; and process the sample target image b following the same method, and extract positions of appearance feature distribution areas respectively of the N target appearance feature sites in the sample target image b, which are designated as Sb. Input Sa' and the predictive synthetic image a' into a pre-trained VGG network to obtain a component feature Fv(a') outputted by the VGG network; input Sb and the sample target image b into the pre-trained VGG network to obtain a component feature Fv(b) outputted by the VGG network; and then based on the component features Fv(a') and Fv(b), determine a component loss Lp by Formula: $Lp=|Fv(a')-Fv(b)|^2$ Step 7: Input the predictive synthetic image a' and the sample source image a into a pre-trained ArcFace network respectively, to obtain facial features Fa(a') and Fa(a) outputted by the ArcFace network, and then determine a face loss Lf by Formula: $Lf=|Fa(a')-Fa(a)|^2$ Step 8: Train both the generator and the discriminator in the initial GAN model using the discriminant loss Lr, and train the generator in the initial GAN model using the global loss La, the component loss Lp, and the facial loss Lf.

Step 9: Repeat steps 2 to 8 until each frame pair constructed is trained.

Step 10: Select more action videos, and repeat steps 1 to 9 until the discriminant loss Lr, the global loss La, the component loss Lp, and the facial loss Lf are all stable. At this time, the training of the initial GAN model is completed, and a GAN model that can be put into practical use is obtained.

For the artificial intelligence-based image generation method described above, this application also provides a corresponding artificial intelligence-based image generation device, so that the image generation method can be used and implemented in practice.

Figure 7:
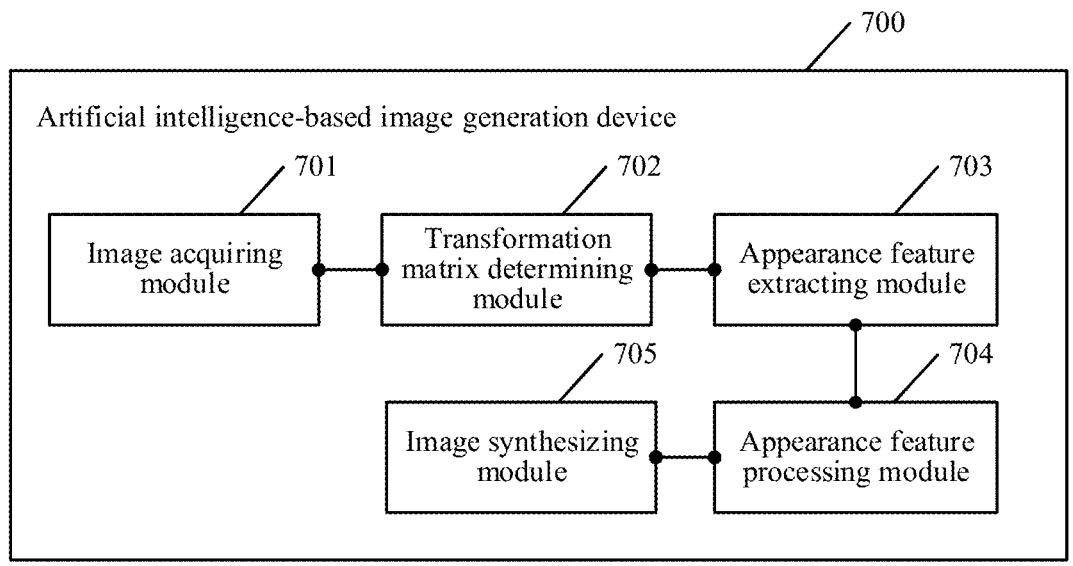
FIG. 7 schematically shows the structure of a first image generation device provided in an embodiment of this application.

FIG. 7 schematically shows the structure of an image generation device 700 corresponding to the image generation method shown in FIG. 2 above. The image generation device 700 is deployed on an apparatus having an image processing ability, and the image generation device 700 includes:

an image acquisition module 701, configured to acquire a source image and a target image, the source image including a target object whose pose is to be transformed, and the target image including a reference object presenting a target pose;

a transformation matrix determining matrix 702, configured to determine a pose transition matrix according to a model pose corresponding to the pose of the target object and a model pose corresponding to the target pose of the reference object;

an appearance feature extracting module 703, configured to extract, as a basic appearance feature, an appearance feature of the target object from the source image;

an appearance feature processing module 704, configured to process the basic appearance feature based on the pose transition matrix, to obtain a target appearance feature of the target object in the target pose; and an image synthesizing module 705, configured to generate a target synthetic image of the target object in the target pose based on the target appearance feature.

In an exemplary implementation, the appearance feature extracting module 703 is configured to extract, as a basic appearance feature, an appearance feature of the target object by a generator from the source image; and the image synthesizing module 705 is configured to generate a target synthetic image by the generator based on the target appearance feature.

In an exemplary implementation, on the basis of the image generation device shown in FIG. 7, the appearance feature extracting module 703 is specifically configured to determine a global feature of the source image by the generator; and extract, as a basic appearance feature, an appearance feature of the target object from the global feature of the source image.

Figure 8:
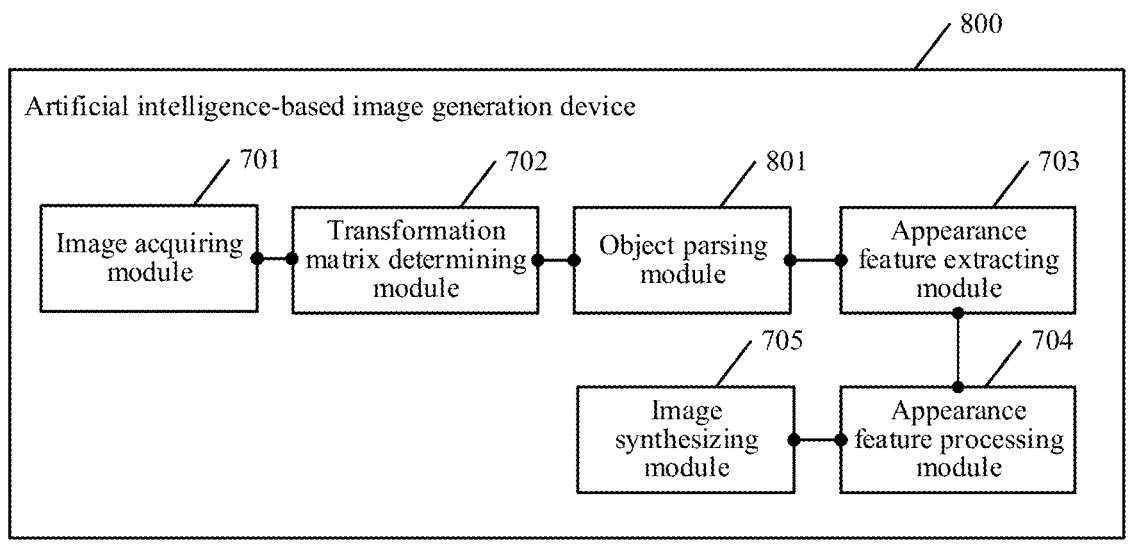
FIG. 8 schematically shows the structure of a second image generation device according to an embodiment of this application.

In an exemplary implementation, on the basis of the image generation device shown in FIG. 7, the structure of another image generation device 800 provided in an embodiment of this application is schematically shown in FIG. 8. As shown in FIG. 8, the device further includes:

an object parsing module 801, configured to determine positions of appearance feature distribution areas respectively corresponding to N target appearance feature sites on the target object in the source image, where N is an integer greater than 1.

Then the appearance feature extracting module 703 is specifically configured to:

extract, according to the positions of appearance feature distribution areas respectively corresponding to the N target appearance feature sites, local features respectively corresponding to the N target appearance feature sites from the global feature of the source image, to form the basic appearance feature.

In an exemplary implementation, on the basis of the image generation device shown in FIG. 7, the image synthesizing module 705 is specifically configured to:

acquire a pose feature of the reference object in the target image, where the pose feature of the reference object is extracted from a global feature of the target image, and the global feature of the target image is determined by the generator; and generate a target synthetic image by the generator based on the pose feature of the reference object and the target appearance feature.

Figure 9:
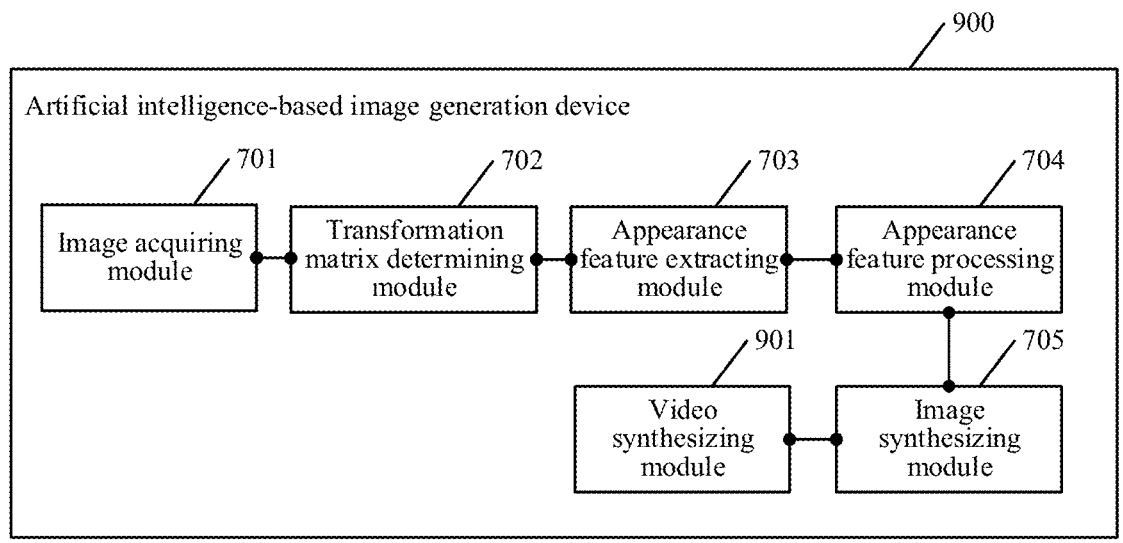
FIG. 9 schematically shows the structure of a third image generation device according to an embodiment of this application.

In an exemplary implementation, on the basis of the image generation device shown in FIG. 7, the target image is a target video frame in a target action video, and the target synthetic image corresponds to the target video frame. FIG. 9 schematically shows the structure of another image generation device 900 provided in an embodiment of this application. As shown in FIG. 9, the device further includes:

a video synthesizing module 901, configured to arrange the target synthetic image respectively corresponding to each target video frame according to the sequence of timing of each target video frame in the target action video to obtain a target synthetic video, after the image synthesizing module 705 generates the target synthetic image respectively corresponding to each target video frame in the target action video.

Figure 10:
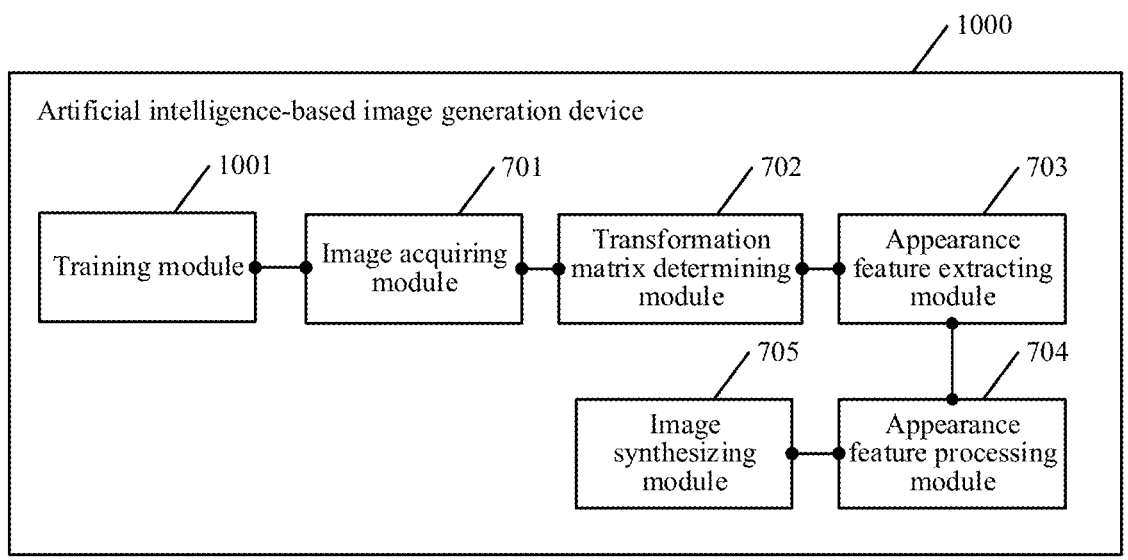
FIG. 10 schematically shows the structure of a fourth image generation device provided in an embodiment of this application.

In an exemplary implementation, on the basis of the image generation device shown in FIG. 7, the structure of another image generation device 1000 provided in an embodiment of this application is schematically shown in FIG. 10. As shown in FIG. 10, the device further includes a training module 1001, and the training module 1001 includes:

a sample acquiring unit, configured to acquire a training sample, in which the training sample includes a sample source image and a sample target image, where the sample source image includes a sample target object whose pose is to be transformed, and the sample target image includes a sample reference object presenting a target transformation pose;

a pose transition matrix determining unit, configured to determine a predictive pose transition matrix according to a model pose corresponding to the sample target object and a model pose corresponding to the sample reference object;

a predictive image synthesizing unit, configured to generate a predictive synthetic image by a generator in an initial generative adversarial network (GAN) model according to the sample source image and the predictive pose transition matrix;

a model loss determining unit, configured to determine a model loss based on at least two of the sample source image, the sample target image, and the predictive synthetic image; and a training unit, configured to train at least one of the generator and a discriminator in the initial GAN model based on the model loss.

In an exemplary implementation, on the basis of the image generation device shown in FIG. 10, the model loss determining unit is specifically configured to:

determine a first discriminant authenticity by the discriminator in the initial GAN model according to the sample source image and the predictive synthetic image;

determine a second discriminant authenticity by the discriminator in the initial GAN model according to the sample source image and the sample target image; and establish, as the model loss, a discriminant loss according to the first discriminant authenticity and the second discriminant authenticity.

The training unit is specifically configured to:

train the generator and the discriminator in the initial GAN model based on the discriminant loss.

In an exemplary implementation, on the basis of the image generation device shown in FIG. 10, the model loss determining unit is specifically configured to:

establish, as the model loss, a global loss according to the difference between the predictive synthetic image and the sample target image; and the training unit is specifically configured to:

train the generator in the initial GAN model based on the global loss.

In an exemplary implementation, on the basis of the image generation device shown in FIG. 10, the model loss determining unit is specifically configured to:

determine the positions of appearance feature distribution areas respectively corresponding to N target appearance feature sites on a predictive target object in the predictive synthetic image, and positions of appearance feature distribution areas respectively corresponding to the N target appearance feature sites on the sample reference object in the sample target image, where N is an integer greater than 1;

for each of the N target appearance feature sites, extract a local feature of a target site in the predictive synthetic image by a deep convolutional neural network model, according to the position of distribution area of the target site in the predictive synthetic image; extract a local feature of a target site in the sample target image by the deep convolutional neural network model, according to the position of distribution area of the target site in the sample target image; and determine, as the model loss, a local component loss corresponding to the target site according to the local feature of the target site in the predictive synthetic image and the local feature of the target site in the sample target image.

The training unit is specifically configured to:

train the generator in the initial GAN model according to the local component loss respectively corresponding to the N target appearance feature sites.

In an exemplary implementation, on the basis of the image generation device shown in FIG. 10, the model loss determining unit is specifically configured to:

determine the positions of appearance feature distribution areas respectively corresponding to N target appearance feature sites on a predictive target object in the predictive synthetic image; determine a first global component feature by using a deep convolutional neural network model according to the positions of appearance feature distribution areas respectively corresponding to the N target appearance feature sites on the predictive target object in the predictive synthetic image, where N is an integer greater than 1;

determine the positions of appearance feature distribution areas respectively corresponding to the N target appearance feature sites on the sample reference object in the sample target image; determine a second global component feature by using the deep convolutional neural network model according to the positions of appearance feature distribution areas respectively corresponding to the N target appearance feature sites on the sample reference object in the sample target image; and establish, as the model loss, a global component loss according to the first global component feature and the second global component feature.

The training unit is specifically configured to:
train the generator in the initial GAN model based on the global component loss.

In an exemplary implementation, on the basis of the image generation device shown in FIG. 10, the model loss determining unit is specifically configured to:

determine, as a first facial feature, a facial feature of a predictive target object by a face recognition network model according to the predictive synthetic image;

determine, as a second facial feature, a facial feature of the sample target object by using the face recognition network model according to the sample source image; and determine, as the model loss, a facial loss according to the first facial feature and the second facial feature.

The training unit is specifically configured to:
train the generator in the initial GAN model based on the facial loss.

Unexpectedly, in the image generation device provided in the embodiments of this application, human pose transfer is performed based on a model pose of a person. Compared with the pose heatmap, the model pose can more accurately characterize the human pose. Therefore, by using the device provided in the embodiments of this application, the human pose can be more accurately transformed, ensuring that the transformed human pose is more consistent with the target pose presented by the reference object in the target image, and ensuring that the finally generated target synthetic image has a better effect after human pose transfer.

An embodiment of this application also provides an image generation apparatus, which can be specifically a server and a terminal apparatus. The server and the terminal apparatus provided in an embodiment of this application will be introduced below from the perspective of hardware instantiation.

Figure 11:
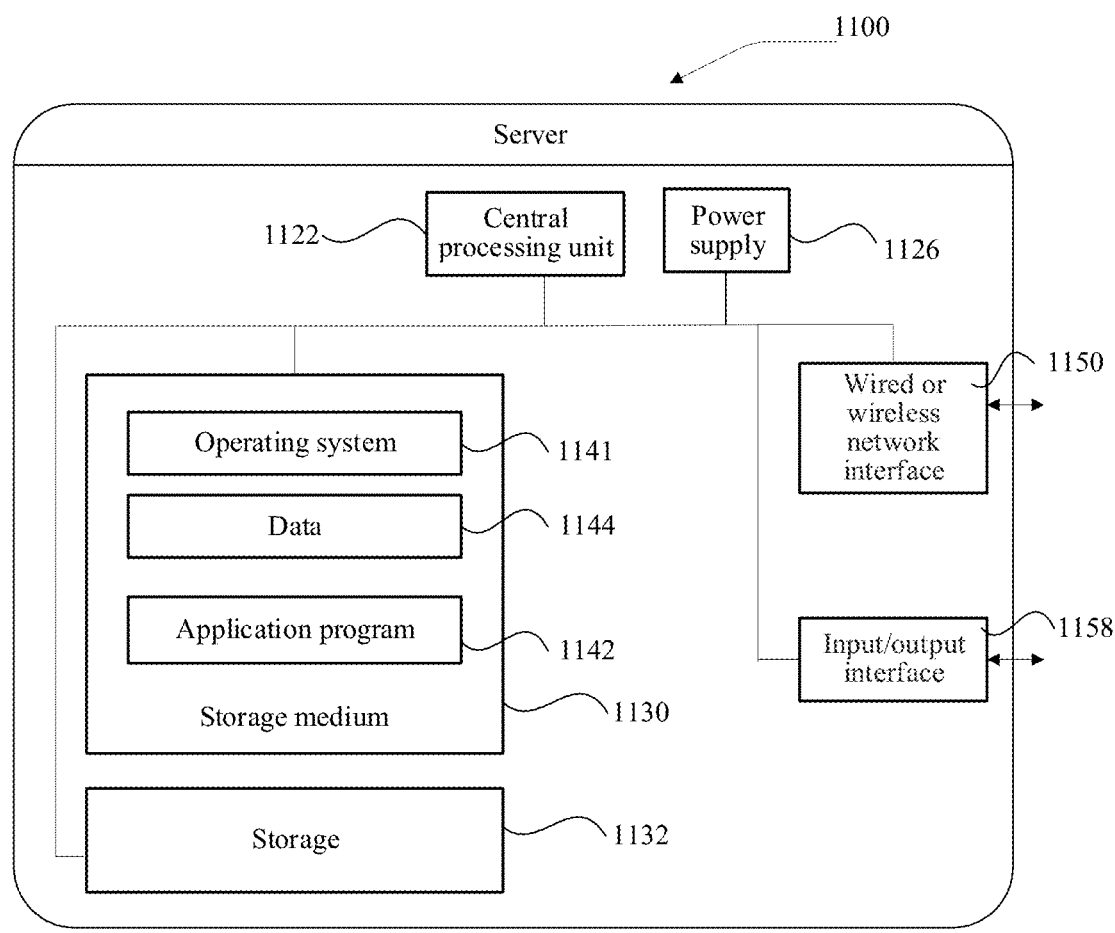
FIG. 11 schematically shows the structure of a server provided in an embodiment of this application.

FIG. 11 schematically shows the structure of a server 1100 provided in an embodiment of this application. The server 1100 may vary considerably depending on configuration or performance, and may include one or more central processing units (CPU) 1122 (for example, one or more processors), a memory 1132, and one or more storage media 1130 (for example, one or more massive storage devices) storing an application program 1142 or data 1144. The memory 1132 and the storage medium 1130 may be transient or persistent storage. The program stored in the storage medium 1130 may include one or more modules (not shown in the figure), and each module may include a series of instructions and operations for the server. Still further, the CPU 1122 may be configured to communicate with the storage medium 1130 to perform the series of instructions and operations in the storage medium 1130 on the server 1100.

The server 1100 may further include one or more power supplies 1126, one or more wired or wireless network interfaces 1150, one or more input/output interfaces 1158, and/or one or more operating systems 1141 such as Windows Server™, Mac OS X™, Unix™, Linux™, and FreeBSD™.

The steps performed by the server in the foregoing embodiments may be based on the server structure shown in FIG. 11.

The CPU 1122 is configured to perform the following operations:

acquiring a source image and a target image, the source image including a target object whose pose is to be transformed, and the target image including a reference object presenting a target pose;

determining a pose transition matrix according to a model pose corresponding to the target object and a model pose corresponding to the reference object;

extracting, as a basic appearance feature, an appearance feature of the target object from the source image;

processing the basic appearance feature based on the pose transition matrix, to obtain a target appearance feature; and generating a target synthetic image based on the target appearance feature.

CPU 1122 may also be configured to perform steps of any implementation of the artificial intelligence-based image generation method provided in the embodiments of this application.

Figure 12:
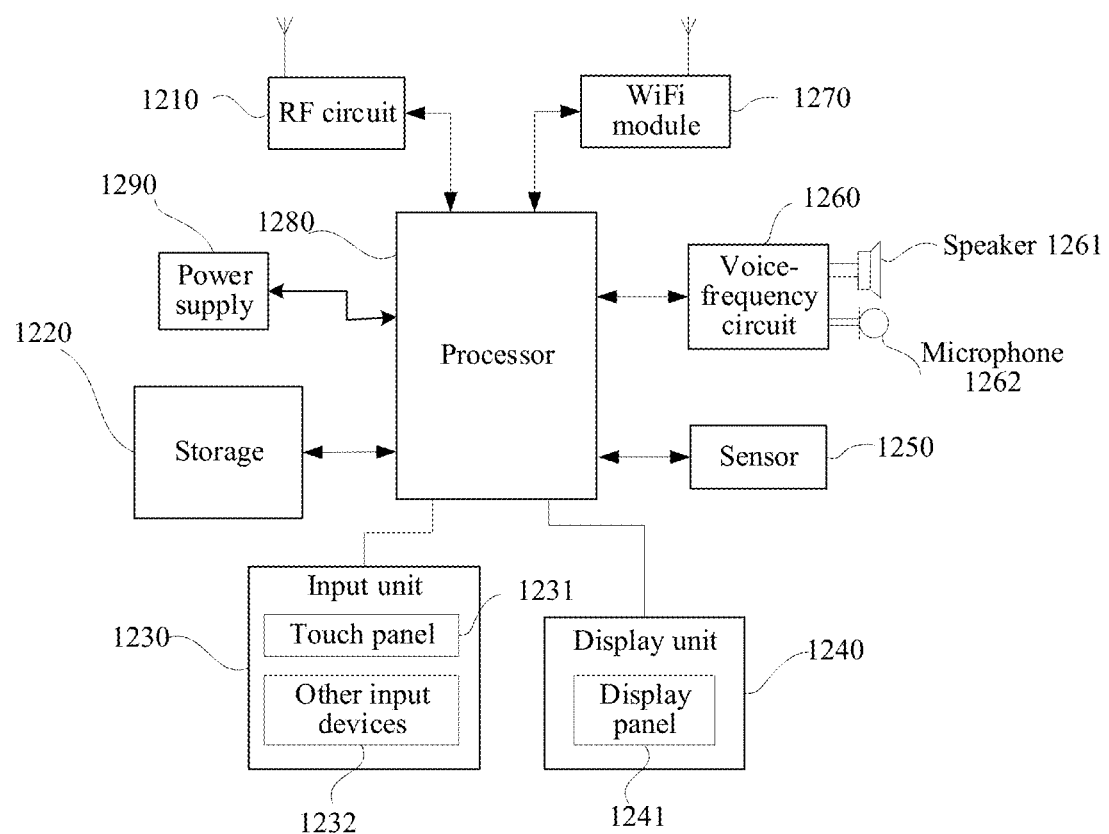
FIG. 12 is a schematic structural diagram of a terminal device according to an embodiment of this application.

Referring to FIG. 12, FIG. 12 is a schematic structural diagram of a terminal device according to an embodiment of this application. For ease of description, only a part related to this embodiment of this application is shown. For a specific technical detail not disclosed, refer to the method part in the embodiments of this application. The terminal can be any terminal apparatus including smart phones, computers, tablet computers, and personal digital assistants, etc. For example, the terminal is a mobile phone.

FIG. 12 is a block diagram showing a partial structure of a mobile phone related to a terminal provided in an embodiment of this application. Referring to FIG. 12, the mobile phone includes components such as: a radio frequency (RF) circuit 1210, a memory 1220, an input unit 1230, a display unit 1240, a sensor 1250, an audio circuit 1260, a wireless fidelity (Wi-Fi) module 1270, a processor 1280, and a power supply 1290. A person skilled in the art may understand that the structure of the mobile phone shown in FIG. 12 does not constitute any limitation on the mobile phone, and instead, the mobile phone may include more or fewer components than those shown in the figure, or some components may be combined, or a different component deployment may be used.

The memory 1220 may be configured to store a software program and a module. The processor 1280 runs the software program and the module that are stored in the memory 1220, so as to perform various function applications of the mobile phone and data processing. The memory 1220 may mainly include a program storage area and a data storage area. The program storage area may store an operating system, an application program required by at least one function (for example, a sound playback function and an image playback function), or the like. The data storage area may store data (for example, audio data and a phone book) created according to use of the mobile phone. In addition, the memory 1220 may include a high speed random access memory, and may further include a non-volatile memory, such as at least one magnetic disk storage device, a flash memory device, or other non-volatile solid state storage devices.

The processor 1280 is a control center of the mobile phone, and is connected to various parts of the entire mobile phone by using various interfaces and lines. By running or executing a software program and/or module stored in the memory 1220, and invoking data stored in the memory 1220, the processor 1280 executes various functions of the mobile phone and performs data processing, thereby monitoring the entire mobile phone. In some embodiments, the processor 1280 may include one or more processing units. Preferably, the processor 1280 may integrate an application processor and a modem processor. The application processor mainly processes an operating system, a user interface, an application program, and the like. The modem processor mainly processes wireless communication. It may be understood that the modem may alternatively not be integrated into the processor 1280.

In this embodiment of this application, the processor 1280 included in the terminal further has the following functions:
  acquiring a source image and a target image, the source image including a target object whose pose is to be transformed, and the target image including a reference object presenting a target pose;
  determining a pose transition matrix according to a model pose corresponding to the target object and a model pose corresponding to the reference object;
  extracting, as a basic appearance feature, an appearance feature of the target object from the source image;
  processing the basic appearance feature based on the pose transition matrix, to obtain a target appearance feature; and
  generating a target synthetic image based on the target appearance feature.

The processor 1280 may also be configured to perform steps of any implementation of the artificial intelligence-based image generation method provided in the embodiments of this application.

An embodiment of this application also provides a computer-readable storage medium, the computer-readable storage medium being configured to store a computer program, the computer program being configured to perform any implementation of the artificial intelligence-based image generation method provided in the various embodiments above.

An embodiment of this application also provides a computer program product including instructions. When the computer program runs on a computer, the computer is caused to perform any implementation of the artificial intelligence-based image generation method provided in the various embodiments above.

A person skilled in the art can clearly understand that for convenience and conciseness of description, for specific working processes of the foregoing described system, apparatus and unit, refer to the corresponding processes in the foregoing method embodiments, and details are not described herein.

In the embodiments provided in this application, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the pre-defined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions in the embodiments.

In addition, functional units in the embodiments of this application may be integrated into one processing unit, or each of the units may exist alone physically, or two or more units are integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the related technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store computer program, such as a USB flash drive, a removable hard disk, a read-only memory (ROM), a random access memory (RAM), a magnetic disk, or an optical disk.

In this application, "at least one" means one or more, and "a plurality of" means two or more. The term "and/or" describes an association between associated objects and represents that three associations may exist. For example, "A and/or B" may indicate that only A exists, only B exists, and both A and B exist, wherein A and B may be singular or plural. The character "/" in this specification generally indicates an "or" relationship between the associated objects. "At least one of the following" or a similar expression thereof refers to any combination of these items, including one item or any combination of more items. For example, at least one of a, b, or c may represent a, b, c, "a and b", "a and c", "b and c", or "a, b, and c", where a, b, and c may be singular or plural.

The foregoing embodiments are merely intended for describing the technical solutions of this application, but not for limiting this application. Although this application is described in detail with reference to the foregoing embodiments, a person of ordinary skill in the art is to understand that they may still make modifications to the technical solutions described in the foregoing embodiments or make equivalent replacements to some technical features thereof, without departing from the spirit and scope of the technical solutions of the embodiments of this application.

What is claimed is:

1. An artificial intelligence-based image generation method performed by a computer device, the method comprising:
    acquiring a 2D source image and a 2D target image, the 2D source image comprising a target object whose pose is to be transformed, and the 2D target image comprising a reference object presenting a target pose, wherein the reference object is different from the target object;
    determining a 3D pose transition matrix according to a 3D model pose corresponding to the to-be-transformed pose of the target object and a 3D model pose corresponding to the target pose of the reference object;
    extracting, as a 3D basic appearance feature, an appearance feature of the target object from the 2D source image;
    processing the 3D basic appearance feature based on the 3D pose transition matrix, to obtain a 3D target appearance feature of the target object in the target pose;
    generating a 2D target synthetic image of the target object in the target pose based on the 3D target appearance feature; and
    outputting the 2D target synthetic image on a display of the computer device.

2. The method according to claim 1, wherein the extracting comprises:
    extracting, as a 3D basic appearance feature, an appearance feature of the target object by a generator from the 2D source image; and
    the generating comprises:
    generating a 2D target synthetic image of the target object in the target pose by the generator based on the 3D target appearance feature.

3. The method according to claim 2, wherein the extracting, as a 3D basic appearance feature, an appearance feature of the target object by a generator from the 2D source image comprises:
    determining a 3D global feature of the source image by the generator; and
    extracting, as a 3D basic appearance feature, an appearance feature of the target object from the 3D global feature of the 2D source image.

4. The method according to claim 3, further comprising:
    determining positions of appearance feature distribution areas respectively corresponding to N target appearance feature sites on the target object in the 2D source image, wherein N is an integer greater than 1; and
    wherein the extracting, as the 3D basic appearance feature, an appearance feature of the target object from the 3D global feature of the 2D source image comprises:
    extracting, according to the positions of appearance feature distribution areas respectively corresponding to the N target appearance feature sites, local features respectively corresponding to the N target appearance feature sites from the 3D global feature of the 2D source image, to form the 3D basic appearance feature.

5. The method according to claim 2, wherein the generating comprises:
    acquiring a pose feature of the reference object in the 2D target image, wherein the pose feature of the reference object is extracted from a 3D global feature of the target image, and the 3D global feature of the 2D target image is determined by the generator; and
    generating a 2D target synthetic image of the target object in the target pose by the generator based on the pose feature of the reference object and the 3D target appearance feature.

6. The method according to claim 1, wherein the 2D target image is one of a plurality of target video frames in a target action video, and the 2D target synthetic image corresponds to each target video frame; and
    after generating a 2D target synthetic image of the target object in a target pose respectively corresponding to each target video frame in the target action video, the method further comprises:
    arranging the 2D target synthetic images respectively corresponding to the target video frames according to the sequence of the target video frames in the target action video to obtain a target synthetic video of the 2D target synthetic images, each target synthetic image including the target object in a target pose corresponding to a corresponding one of the target video frames.

7. The method according to claim 1, wherein the 3D model pose corresponding to the pose of the target object comprises a 3D model corresponding to the target object having the pose to be transformed; and the 3D model pose corresponding to the target pose of the reference object comprises a 3D model corresponding to the reference object having the target pose.

8. A computer device comprising a processor and a storage, the storage being configured to store a plurality of computer programs; and the processor being configured to execute the plurality of computer programs to implement an artificial intelligence-based image generation method including:

acquiring a 2D source image and a 2D target image, the 2D source image comprising a target object whose pose is to be transformed, and the 2D target image comprising a reference object presenting a target pose, wherein the reference object is different from the target object;

determining a 3D pose transition matrix according to a 3D model pose corresponding to the to-be-transformed pose of the target object and a 3D model pose corresponding to the target pose of the reference object;

extracting, as a 3D basic appearance feature, an appearance feature of the target object from the 2D source image;

processing the 3D basic appearance feature based on the 3D pose transition matrix, to obtain a 3D target appearance feature of the target object in the target pose;

generating a 2D target synthetic image of the target object in the target pose based on the 3D target appearance feature; and outputting the 2D target synthetic image on a display of the computer device.

9. The computer device according to claim 8, wherein the extracting comprises:

extracting, as a 3D basic appearance feature, an appearance feature of the target object by a generator from the 2D source image; and the generating comprises:

generating a 2D target synthetic image of the target object in the target pose by the generator based on the 3D target appearance feature.

10. The computer device according to claim 9, wherein the extracting, as a 3D basic appearance feature, an appearance feature of the target object by a generator from the 2D source image comprises:

determining a 3D global feature of the source image by the generator; and extracting, as a 3D basic appearance feature, an appearance feature of the target object from the 3D global feature of the 2D source image.

11. The computer device according to claim 10, wherein the method further comprises:

determining positions of appearance feature distribution areas respectively corresponding to N target appearance feature sites on the target object in the 2D source image, wherein N is an integer greater than 1; and wherein the extracting, as the 3D basic appearance feature, an appearance feature of the target object from the 3D global feature of the 2D source image comprises:

extracting, according to the positions of appearance feature distribution areas respectively corresponding to the N target appearance feature sites, local features respectively corresponding to the N target appearance feature sites from the 3D global feature of the 2D source image, to form the 3D basic appearance feature.

12. The computer device according to claim 9, wherein the generating comprises:

acquiring a pose feature of the reference object in the 2D target image, wherein the pose feature of the reference object is extracted from a 3D global feature of the target image, and the 3D global feature of the 2D target image is determined by the generator; and generating a 2D target synthetic image of the target object in the target pose by the generator based on the pose feature of the reference object and the 3D target appearance feature.

13. The computer device according to claim 8, wherein the target image is one of a plurality of target video frames in a target action video, and the target synthetic image corresponds to each target video frame; and after generating a 2D target synthetic image of the target object in a target pose respectively corresponding to each target video frame in the target action video, the method further comprises:

arranging the 2D target synthetic images respectively corresponding to the target video frames according to the sequence of the target video frames in the target action video to obtain a target synthetic video of the 2D target synthetic images, each target synthetic image including the target object in a target pose corresponding to a corresponding one of the target video frames.

14. The computer device according to claim 8, wherein the 3D model pose corresponding to the pose of the target object comprises a 3D model corresponding to the target object having the pose to be transformed; and the 3D model pose corresponding to the target pose of the reference object comprises a 3D model corresponding to the reference object having the target pose.

15. A non-transitory computer-readable storage medium, the non-transitory computer-readable storage medium being configured to store a plurality of computer programs, and the plurality of computer programs, when executed by a processor of a computer device, causing the computer device to implement an artificial intelligence-based image generation method including:

acquiring a 2D source image and a 2D target image, the 2D source image comprising a target object whose pose is to be transformed, and the 2D target image comprising a reference object presenting a target pose, wherein the reference object is different from the target object;

determining a 3D pose transition matrix according to a 3D model pose corresponding to the to-be-transformed pose of the target object and a 3D model pose corresponding to the target pose of the reference object;

extracting, as a 3D basic appearance feature, an appearance feature of the target object from the 2D source image;

processing the 3D basic appearance feature based on the 3D pose transition matrix, to obtain a 3D target appearance feature of the target object in the target pose;

generating a 2D target synthetic image of the target object in the target pose based on the 3D target appearance feature; and outputting the 2D target synthetic image on a display of the computer device.

16. The non-transitory computer-readable storage medium according to claim 15, wherein the extracting comprises:

extracting, as a 3D basic appearance feature, an appearance feature of the target object by a generator from the 2D source image; and the generating comprises:

generating a 2D target synthetic image of the target object in the target pose by the generator based on the 3D target appearance feature.

17. The non-transitory computer-readable storage medium according to claim 16, wherein the extracting, as a 3D basic appearance feature, an appearance feature of the target object by a generator from the 2D source image comprises:
  determining a 3D global feature of the source image by the generator; and
  extracting, as a 3D basic appearance feature, an appearance feature of the target object from the 3D global feature of the 2D source image.

18. The non-transitory computer-readable storage medium according to claim 16, wherein the generating comprises:
  acquiring a pose feature of the reference object in the 2D target image, wherein the pose feature of the reference object is extracted from a 3D global feature of the target image, and the 3D global feature of the 2D target image is determined by the generator; and
  generating a 2D target synthetic image of the target object in the target pose by the generator based on the pose feature of the reference object and the 3D target appearance feature.

19. The non-transitory computer-readable storage medium according to claim 15, wherein the target image is one of a plurality of target video frames in a target action video, and the target synthetic image corresponds to each target video frame; and
  after generating a 2D target synthetic image of the target object in a target pose respectively corresponding to each target video frame in the target action video, the method further comprises:
  arranging the 2D target synthetic images respectively corresponding to the target video frames according to the sequence of the target video frames in the target action video to obtain a target synthetic video of the 2D target synthetic images, each target synthetic image including the target object in a target pose corresponding to a corresponding one of the target video frames.

20. The non-transitory computer-readable storage medium according to claim 15, wherein the 3D model pose corresponding to the pose of the target object comprises a 3D model corresponding to the target object having the pose to be transformed; and the 3D model pose corresponding to the target pose of the reference object comprises a 3D model corresponding to the reference object having the target pose.

* * * * *